United States Patent
Krunic et al.

(10) Patent No.: US 11,946,748 B1
(45) Date of Patent: *Apr. 2, 2024

(54) AUTOMATED VEHICLE CONTROL AND GUIDANCE BASED ON REAL-TIME BLIND CORNER NAVIGATIONAL ANALYSIS

(71) Applicant: Allstate Insurance Company, Northbrook, IL (US)

(72) Inventors: Veljko Krunic, Boulder, CO (US); Sunil Chintakindi, Menlo Park, CA (US); Timothy W. Gibson, Barrington, IL (US); Howard Hayes, Glencoe, IL (US); Surender Kumar, Palatine, IL (US)

(73) Assignee: Allstate Insurance Company, Northbrook, IL (US)

( * ) Notice: Subject to any disclaimer, the term of this patent is extended or adjusted under 35 U.S.C. 154(b) by 214 days.

This patent is subject to a terminal disclaimer.

(21) Appl. No.: 17/157,351

(22) Filed: Jan. 25, 2021

Related U.S. Application Data

(63) Continuation of application No. 15/958,205, filed on Apr. 20, 2018, now Pat. No. 10,907,978, which is a
(Continued)

(51) Int. Cl.
*G01C 21/34* (2006.01)
*G01C 21/36* (2006.01)
(Continued)

(52) U.S. Cl.
CPC ..... *G01C 21/3407* (2013.01); *G01C 21/3629* (2013.01); *G01C 21/3644* (2013.01); *G06F 18/2415* (2023.01); *G06V 20/56* (2022.01)

(58) Field of Classification Search
CPC ............ G01C 21/3407; G01C 21/3629; G01C 21/3644; G06V 20/56
See application file for complete search history.

(56) References Cited

U.S. PATENT DOCUMENTS 6,175,803 B1   1/2001   Chowanic et al.
6,420,977 B1   7/2002   Corbitt et al.
(Continued)

OTHER PUBLICATIONS

Jan. 23, 2018—U.S. Notice of Allowance—U.S. Appl. No. 15/205,046.
(Continued)

*Primary Examiner* — Nicholas Kiswanto
(74) *Attorney, Agent, or Firm* — Polsinelli PC

(57) ABSTRACT

Methods, computer-readable media, systems and apparatuses for determining a blind corner navigational score based on real-time or near real-time navigational analysis using sensor data, digital image data, and a map database are discussed. In some arrangements, detection of a blind sensor may be performing using sensor data, digital image data, and navigational data from a map database system. In at least some arrangements, a warning signal or a vehicle control signal may be transmitted to a vehicle in response to a determination that the blind corner navigational score is above a threshold. In at least some arrangements, route correction and/or route modification based on an upcoming blind corner may be performed if a blind corner navigational score is above a threshold.

20 Claims, 8 Drawing Sheets

Related U.S. Application Data continuation of application No. 15/205,046, filed on Jul. 8, 2016, now Pat. No. 9,983,013.

(51) Int. Cl.
  *G06F 18/2415* (2023.01)
  *G06V 20/56* (2022.01)

(56) References Cited

U.S. PATENT DOCUMENTS

| | | |
|---|---|---|
| 7,031,496 B2 | 4/2006 | Shimano et al. |
| 8,204,681 B2 | 6/2012 | Hirose |
| 8,362,922 B2 | 1/2013 | Kushi et al. |
| 8,482,431 B2 | 7/2013 | Kushi et al. |
| 8,633,834 B2 | 1/2014 | Lee et al. |
| 9,562,779 B2 | 2/2017 | Lynch |
| 9,733,093 B2 | 8/2017 | Denaro |
| 9,869,564 B2 * | 1/2018 | MacGougan ...... G01C 21/3697 |
| 9,983,013 B1 | 5/2018 | Krunic et al. |
| 2013/0204455 A1 * | 8/2013 | Chia .................. G07C 5/0858 701/1 |
| 2014/0257869 A1 * | 9/2014 | Binion ................. G06Q 40/08 705/4 |

OTHER PUBLICATIONS

May 6, 2020—U.S. Non Final Office Action—U.S. Appl. No. 15/958,205.
Sep. 23, 2020—U.S. Notice of Allowance—U.S. Appl. No. 15/958,205.

* cited by examiner

AUTOMATED VEHICLE CONTROL AND GUIDANCE BASED ON REAL-TIME BLIND CORNER NAVIGATIONAL ANALYSIS

This application is a continuation of U.S. patent application Ser. No. 15/958,205 filed Apr. 20, 2018, which is a continuation of U.S. patent application Ser. No. 15/205,046 filed Jul. 8, 2016, now issued as U.S. Pat. No. 9,983,013, which are incorporated herein by reference their entirety.

TECHNICAL FIELD

Various aspects of the disclosure relate to data processing systems for automated vehicle control, guidance, and/or operation based on real-time or near real-time navigational analysis using sensor data, digital image data, and a map database. More specifically, aspects of the disclosure relate to performing data processing using data from sensors, digital imagers, and a map database in order to determine an upcoming blind corner on a navigational route and to perform route correction or route modification based on the upcoming blind corner.

BACKGROUND

Being aware of hazardous driving conditions can aid in improving the likelihood of a safe driving experience. However, often drivers rely on navigational guidance systems that do not alert drivers of upcoming driving hazards. Although many vehicles include sensing devices to detect changing conditions, those devices may be best suited to evaluate current conditions rather than conditions associated with a road segment that a driver is approaching. Accordingly, it may be advantageous to detect upcoming potential dangers and provide adequate warnings to drivers.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, systems, and apparatuses for determining a blind corner navigational score based on real-time or near real-time navigational analysis using sensor data, digital image data, and a map database. In some arrangements, the system may be a blind corner navigation system that includes at least one processor; and at least one memory storing computer-executable instructions that, when executed by the at least one processor, cause the blind corner navigation system to perform blind corner analysis.

For example, in some arrangements, the system may receive predefined navigational data from a map database system, process the predefined navigational data to detect an upcoming blind corner, receive dynamic navigational data from a digital imaging device, process the dynamic navigational data to determine a blind corner navigational score, the blind corner navigational score indicating a likelihood that the upcoming blind corner is visible from a vantage point of a vehicle, determine whether the blind corner navigational score is above a first threshold, and responsive to a determination that the blind corner navigational score is above a first threshold, transmitting one or more of a warning signal or a vehicle control signal to the vehicle. In at least some arrangements, the digital imaging device may be mounted on the vehicle. The dynamic navigational data may include one or more digital images transmitted from the digital imaging device. In one instance, processing the dynamic navigational data to determine a blind corner navigational score may include performing image analysis on the one or more digital images. For example, the predefined navigational data may include information indicative of a location of a landmark, and performing image analysis may include comprises determining whether the landmark is visible within the one or more digital images.

In at least some arrangements, transmitting the one or more of a warning signal or a vehicle control signal to the vehicle may include transmitting a first audio signal to the vehicle responsive to determining that the blind corner navigational score is above a second threshold and transmitting a first vehicle control signal to the vehicle responsive to determining that the blind corner navigational score is above a third threshold. The first vehicle control signal may be associated with a vehicle control event that is adjusted based on a response time of the vehicle. The first threshold may be dynamically modified based on weather conditions and/or a condition of a road on which the vehicle is currently located.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more non-transitory computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
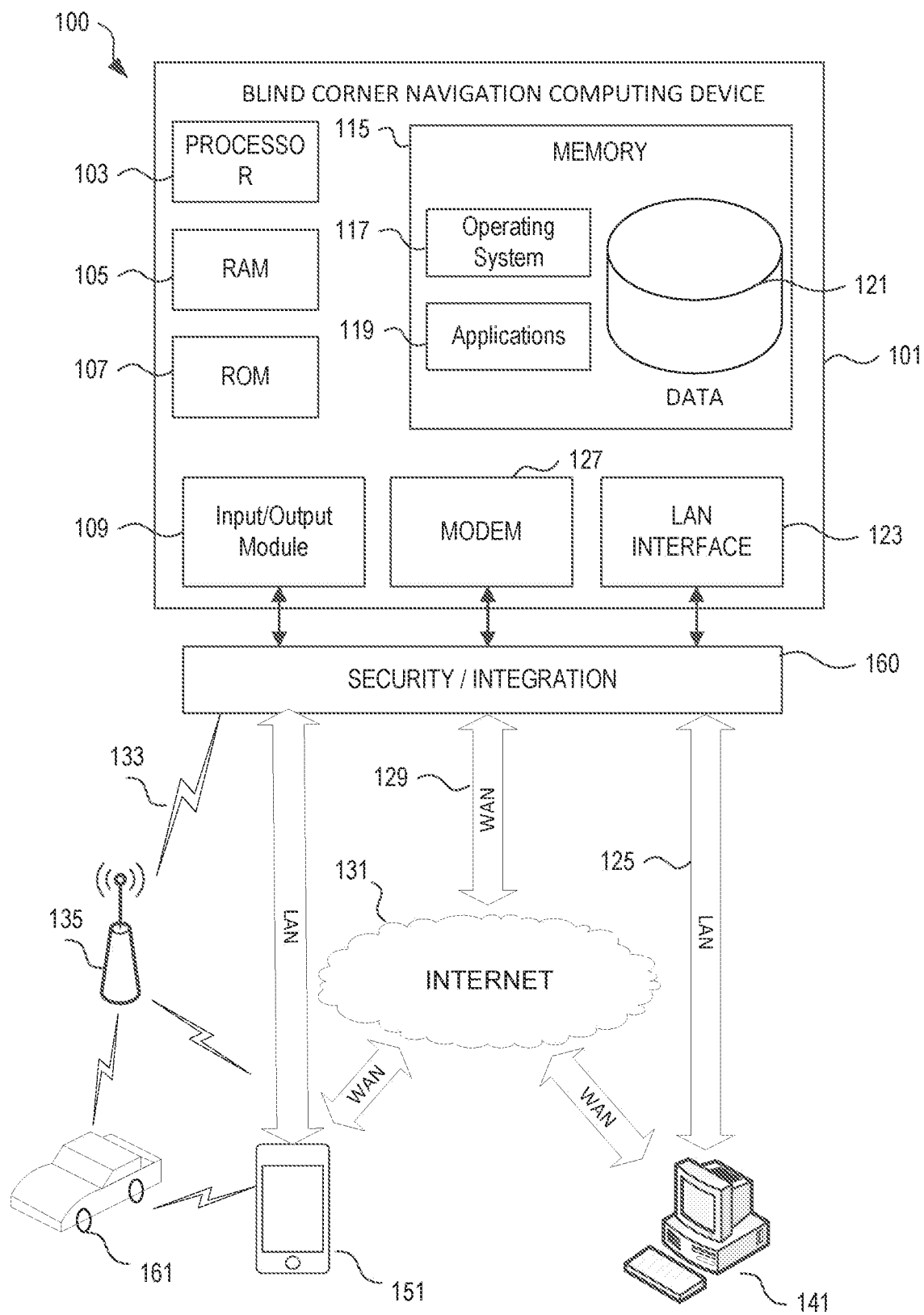
FIG. 1 illustrates computing systems and a network environment that may be used to implement aspects of the disclosure.

FIG. 1 illustrates a block diagram of an example blind corner navigation computing device (or system) 101 in a computer system 100 that may be used according to one or more illustrative embodiments of the disclosure. The blind corner navigation computing device 101 may have a processor 103 having circuitry for controlling overall operation of the device 101 and its associated components, including RAM 105, ROM 107, input/output module 109, and memory 115. The blind corner navigation computing device 101, along with one or more additional devices (e.g., terminals 141 and 151, security and integration hardware 160) may correspond to any of multiple systems or devices described herein, such as personal mobile devices, vehicle-based computing devices, insurance systems servers, blind corner navigation servers, internal data sources, external data sources, and other various devices in a blind corner navigation system. These various computing systems may be configured individually or in combination, as described herein, to collect and analyze driver data, vehicle data (such as sensor data and digital imaging data), environmental sensor data, and/or driving trip data, detect upcoming blind corners based on the received data, provide audio and/or visual warning signals to a vehicle, provide vehicular controls to a vehicle, provide modified or corrected route options to a driver, and the like, using the devices of the blind corner navigation systems described herein. In addition to the features described above, the techniques described herein also may be used for controlling operation of a vehicle, a vehicle sub-system, and/or a vehicle component, generating and presenting blind corner navigational scores, proposed corrected routes or modified routes, or the like, to users (e.g., via a computing device, such as an on-board vehicle computing device, mobile device, or the like).

Input/Output (I/O) 109 may include a microphone, keypad, touch screen, and/or stylus through which a user of the blind corner navigation computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various actions. For example, memory 115 may store software used by the device 101, such as an operating system 117, application programs 119, and an associated internal database 121. The various hardware memory units in memory 115 may include volatile and nonvolatile, removable and non-removable media implemented in any method or technology for storage of information such as computer-readable instructions, data structures, program modules or other data. Certain devices and systems within blind corner navigation systems may have minimum hardware requirements in order to support sufficient storage capacity, processing capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a device 101 (e.g., a personal mobile device 101, vehicle-based device 101, blind corner navigation server 101, etc.), in order to collect and analyze driver data, vehicle data (such as sensor data and digital imaging data), environmental sensor data, and/or driving trip data, detect upcoming blind corners based on the received data, provide audio and/or visual warnings to a driver, provide vehicular controls to a vehicle, provide modified or corrected route options to a driver, etc., using the various devices of the blind corner navigation systems. Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 Ghz or faster). Processor(s) 103 and its associated components may allow the system 101 to execute a series of computer-readable instructions, for example, collect and analyze driver data, vehicle data (such as sensor data and digital imaging data), environmental sensor data, and/or driving trip data, detect upcoming blind corners based on the received data, provide audio and/or visual warnings to a driver, provide vehicular control event signals to a vehicle, provide modified or corrected route options to a driver, and the like.

The computing device (e.g., a personal mobile device, vehicle-based system, insurance system server, blind corner navigation server, etc.) may operate in a networked environment 100 supporting connections to one or more remote computers, such as terminals 141, 151, and 161. Such terminals may be personal computers or servers 141 (e.g., home computers, laptops, web servers, database servers), mobile communication devices 151 (e.g., mobile phones, tablet computers, etc.), vehicle-based computing systems 161 (e.g., on-board vehicle systems, telematics devices, mobile phones or other personal mobile devices within vehicles), and the like, each of which may include some or all of the elements described above with respect to the blind corner navigation computing device 101. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 151 and 161 (e.g., mobile phones, portable customer computing devices, vehicle-based computing devices and systems, etc.) via one or more network devices 135 (e.g., base transceiver stations) in the wireless network 133.

Also illustrated in FIG. 1 is a security and integration layer 160, through which communications are sent and managed between the device 101 (e.g., a personal mobile device, a vehicle-based computing device, a blind corner navigation server, an intermediary server and/or external data source servers, etc.) and the remote devices (141, 151, and 161) and remote networks (125, 129, and 133). The security and integration layer 160 may comprise one or more separate computing devices, such as web servers, authentication servers, and/or various networking components (e.g., firewalls, routers, gateways, load balancers, etc.), having some or all of the elements described above with respect to the computing device 101. As an example, a security and integration layer 160 of a server 101 may comprise a set of web application servers configured to use secure protocols and to insulate the device 101 from external devices 141, 151, and 161. In some cases, the security and integration layer 160 may correspond to a set of dedicated hardware and/or software operating at the same physical location and under the control of same entities as device 101. For example, layer 160 may correspond to one or more dedicated web servers and network hardware in a vehicle and driver information datacenter or in a cloud infrastructure supporting cloud-based vehicle identification, vehicle and driver data retrieval and analysis, sensor data retrieval and analysis, and the like. In other examples, the security and integration layer 160 may correspond to separate hardware and software components which may be operated at a separate physical location and/or by a separate entity.

As discussed below, the data transferred to and from various devices in a blind corner navigation system 100 may include secure and sensitive data, such as confidential vehicle operation data, insurance policy data, and confidential user data from drivers and passengers in vehicles. Therefore, it may be desirable to protect transmissions of such data by using secure network protocols and encryption, and also to protect the integrity of the data when stored on the various devices within a system, such as personal mobile devices, vehicle-based devices, insurance servers, blind corner navigation servers, external data source servers, or other computing devices in the system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in an electronic display system 100. Data may be transmitted through the security and integration layer 160, using various network communication protocols. Secure data transmission protocols and/or encryption may be used in file transfers to protect to integrity of the data, for example, File Transfer Protocol (FTP), Secure File Transfer Protocol (SFTP), and/or Pretty Good Privacy (PGP) encryption. In other examples, one or more web services may be implemented within the various devices 101 in the system 100 and/or the security and integration layer 160. The web services may be accessed by authorized external devices and users to support input, extraction, and manipulation of the data (e.g., vehicle data, driver data, driving trip data, road segment sensor data, etc.) between the various devices 101 in the system 100. Web services built to support a personalized display system may be cross-domain and/or cross-platform, and may be built for enterprise use. Such web services may be developed in accordance with various web service standards, such as the Web Service Interoperability (WS-I) guidelines. In some examples, a driver data, vehicle data, road segment sensor data, and/or driving trip data analysis web service, a blind corner navigation web service, or the like, may be implemented in the security and integration layer 160 using the Secure Sockets Layer (SSL) or Transport Layer Security (TLS) protocol to provide secure connections between servers 101 and various clients 141, 151, and 161. SSL or TLS may use HTTP or HTTPS to provide authentication and confidentiality. In other examples, such web services may be implemented using the WS-Security standard, which provides for secure SOAP messages using XML, encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a database of driver data, driving behaviors or characteristics, passenger-related data, vehicle data, driving trip data, road segment sensor data, etc.) is cached in a separate smaller database on an application server separate from the database server (e.g., at a personal mobile device, vehicle-based data, or intermediary network device or cache device, etc.). For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of blind corner navigation systems, such as faster response times and less dependence on network conditions when transmitting and receiving driver information, vehicle information, driving trip information, sensor data, digital image data, and the like.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as Bluetooth, GSM, CDMA, WiFi, WiMAX, and LTE, is presumed, and the various computing devices in blind corner navigation system components described herein may be configured to communicate using any of these network protocols or technologies.

Additionally, one or more application programs 119 may be used by the various computing devices 101 within a blind corner navigation system 100 (e.g., vehicle data, driver data, road segment sensor data, and/or driving trip data analysis software applications, blind corner navigation software applications, etc.), including computer executable instructions for receiving and analyzing various driver data, vehicle data, environmental sensor data, digital imaging data, and/or driving trip data, detecting upcoming blind corners, providing audio and/or visual warnings to a driver based on a detected upcoming blind corner, providing vehicular control event signals to a vehicle, and/or performing route correction or modification based on blind corner data.

Figure 2:
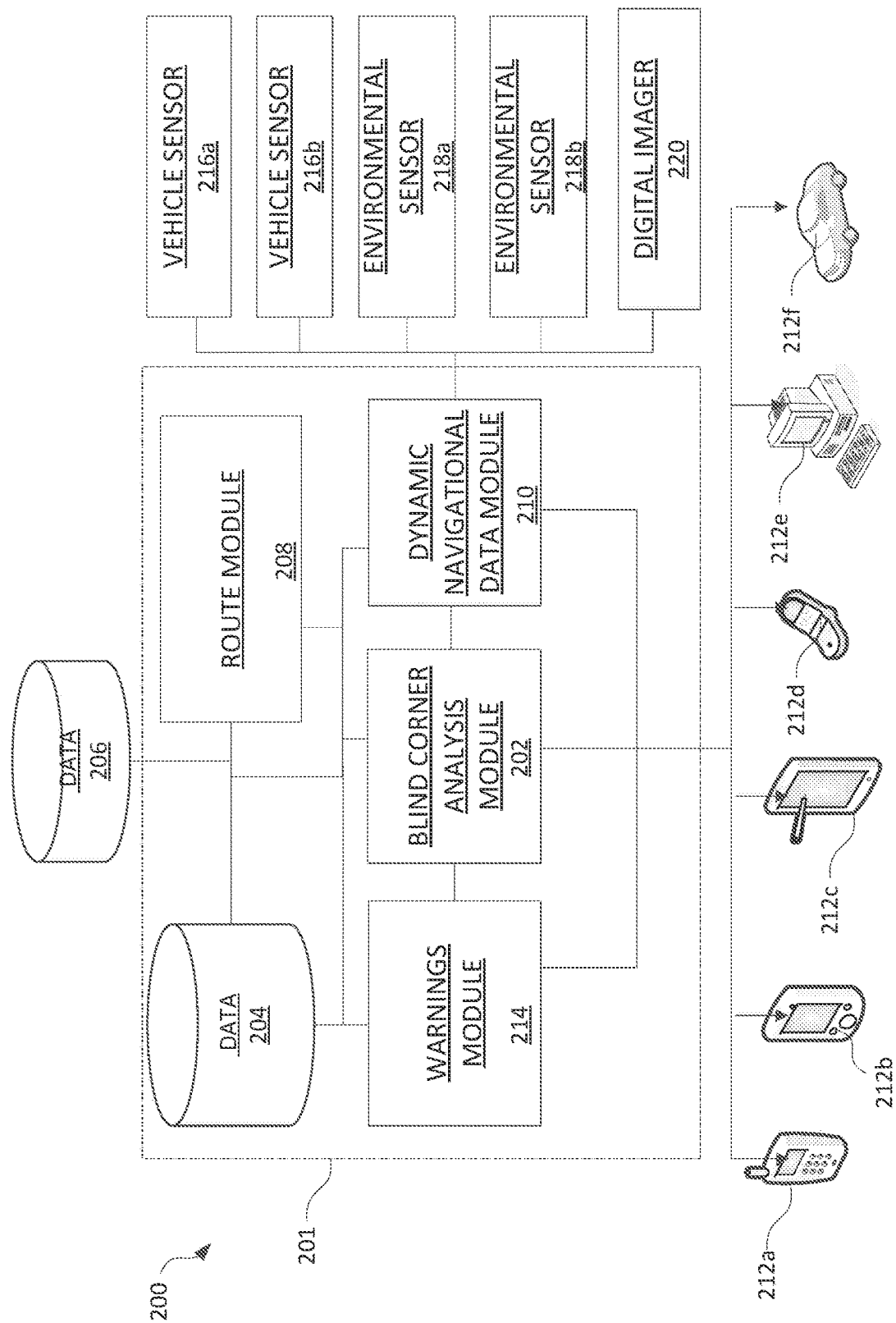
FIG. 2 is an example blind corner navigation system according to one or more aspects described herein.

FIG. 2 is a schematic diagram of an illustrative blind corner navigation system 200. The blind corner navigation system 200 may be associated with, internal to, operated by, or the like, an entity 201, such as an insurance provider. In some examples, the entity may be one of various other types of entities, such as a government entity, corporation or business, university, or the like. Various examples described herein will be discussed in the context of an insurance provider. However, nothing in the specification should be viewed as limiting use of the systems, methods, arrangements, etc. described herein to use only by an insurance provider.

The blind corner navigation system 200 may include one or more modules that may include hardware and/or software configured to perform various functions within the system 200. The one or more modules may be separate, physical devices or, in other examples, one or more modules may be part of the same physical device. A module may include a set of instructions stored in a physical memory that are executable by a processor (such as processor 103 in FIG. 1) to carry out aspects and functions associated with receiving and analyzing various driver data, vehicle data, environmental sensor data, digital imaging data, and/or driving trip data, detecting upcoming blind corners, providing audio and/or visual warnings to a driver based on a detected upcoming blind corner, providing vehicular control event signals to a vehicle, and/or performing route correction or modification based on blind corner data.

The blind corner navigation system 200 may include a blind corner analysis module 202. The blind corner analysis module 202 may include hardware and/or software configured to receive electronic signals from one or more sensing devices (such as sensors 216a, 216b, 218a, and 218b) and one or more digital imaging devices (such as digital imager 218a) and determine a blind corner rating for a particular road segment or driving route. In some arrangements, the blind corner analysis module 202 may also receive data from route module 208. Route module 208 may provide information associated with a route (or road) on which a vehicle is currently traveling or plans on traveling. In some arrangements, the blind corner analysis module 202 may also receive data from one or more data stores 204 and 206. The data store may be internal to or associated with the entity, such as data store 204, or may be external to the entity, such as data store 206. In some arrangements, the data stores 204, 206 may include publicly available information and/or non-public information.

In some examples, data stores 204, 206 may store information related to one or more road segments. A road segment may include a road, portion of a road, bridge, on-ramp, off-ramp, or any other roadway or portion of a roadway on which vehicles may travel. The data stores 204, 206 may include global positioning system data related to a location of a road segment, historical data associated with the road segment (e.g., accident data, frequency of accidents, severity of accidents, and the like), a configuration of the road segment (e.g., curved, straight, severe curve, etc.), historic weather data, speed limit data, lighting conditions along the road segment, map data, and the like.

In some arrangements, one or more of data stores 204, 206 may store data related to driving behaviors of a user (e.g., received from a telematics device within a vehicle operated by the user, received from a mobile device of a user, etc.). One or more of data stores 204, 206 may include vehicle operational data associated with a plurality of vehicles, as well as insurance information for the plurality of vehicles, accident histories, claims data, and the like.

Various other types of data may be stored in one or more of data stores 204, 206 without departing from the present disclosure. For instance, one or more of data stores 204, 206 may also store sensor data (e.g., electronic signals/data) received from one or more sensing devices (such as sensors 216a, 216b and 218a, 218b). Sensors 216a and 216b may be vehicle-based sensors that may detect various vehicle operational data, as will be discussed more fully herein. Sensors 218a, 218b may be environmental sensors configured to detect conditions along a road segment. For instance, the road segment sensors may be arranged along a road segment (for example, on traffic lights, stop signs, or embedded within or positioned adjacent to the road) and may be configured to detect moisture, temperature, pressure, weight, debris in the road segment, potholes or bumps in the road segment, pedestrian traffic, salinity or other road treatment along the road segment (to indicate possible ice melting), and the like, as will be discussed more fully herein. Digital imager 220 may be a digital imaging device that may transmit one or more digital images to dynamic navigational data module 210. Digital imager 220 may be a vehicle-mounted digital imaging device, such as a digital camera. Alternatively, digital imager 220 may be mounted along an infrastructure element along a road, such as a barrier, stop sign, traffic light, etc. Data from sensors 216a, 216b, 218a, and 218b, and from digital imager 220 may be transmitted to, for instance, dynamic navigational data module 210 for processing, as will be discussed more fully herein.

The blind corner navigation system 200 may further include a route module 208. The route module 208 may receive data related to a current location of a user and a desired destination location of a user. The route module 208 may calculate a preliminary route for the user using map data from data store 204, 206. Blind corner analysis module 202 may analyze the preliminary route using data from data store 204, 206. Blind corner analysis module 202 may determine a blind corner navigational score for the preliminary route. If the blind corner navigational score is above a threshold, the route module 208 may generate one or more alternative routes that that may have be relatively less dangerous and/or pose relatively fewer hazards due to blind corners. The alternative routes may be selected based on historical data and/or based on real-time or near real-time ratings received from the dynamic navigational data module 210.

In some examples, the blind corner analysis module 202 may receive or identify a blind corner navigational score for a road segment on which a vehicle is traveling. A blind corner may include an intersection along a route of travel that is not yet visible from a current vantage point. A blind corner may also include a curve along the route of travel that is not yet visible from a current vantage point. The vantage point of a vehicle includes the vantage point of a driver of the vehicle as well as the vantage point of the digital imager. The intersection may be a three-way intersection (e.g., a T-junction, a Y-junction/fork), a four-way intersection (e.g., a crossroads), a five-way intersection, a six-way intersection, and the like. The intersection may not be visible from certain vantage points due to, for example, a curve in the road, a fixed or movable obstructions positioned near the intersection (e.g., plants, buildings, geologic features, other vehicles, etc.), weather conditions (e.g., rain, snow, fog), lighting conditions (e.g., darkness), a lack of any landmarks or other signals indicating the presence of the intersection, and the like. The blind corner analysis module 202 may receive utilize map data received from data stores 204, 206 to identify an upcoming intersection or curve. For example, the map data may be stored within a map database system stored in one or more of data stores 204, 206. The blind corner analysis module 202 may further receive digital images from digital imager 220, which may be mounted on the traveling vehicle. The blind corner analysis module 202 may process the digital images from the vehicle-mounted digital imager 220 to determine a likelihood that the upcoming intersection or curve is visible from the vantage point of the traveling vehicle. The likelihood that the upcoming intersection or curve is visible from the vantage point of the traveling vehicle may be used to calculate a blind corner navigational score.

If the blind corner navigational score is higher than a threshold, warnings module 214 may trigger one or more audio or visual warnings, as discussed in detail below. Additionally, or alternatively, warnings module 214 may trigger one or more vehicular control events, as discussed in detail below. Triggering the audio/visual warnings and/or the vehicular control events may include transmitting a warnings signal and/or a vehicular control event signal to a vehicle. In an alternative embodiment, vehicular control event signals may be transmitted from a separate module (not shown). In the alternative embodiment, the module transmitting the vehicular control event signals may communicate with warnings module 214 in order to exchange data and/or synchronize (or coordinate) the transmittal of signals to a vehicle. The audio or visual warnings and/or the vehicular control events may be adjusted based on data received from sensors 216a, 216b, 218a, and 218b and/or data stores 204, 206. In one arrangement, warnings module 214 may use environmental data received from environmental sensors 218a, 218b to adjust the vehicular control triggers. In another arrangement, warnings module 214 may use driver profile data received from data store 204, 206 to adjust the audio or visual warnings presented to the driver. Information, such as warnings, vehicular control events, and alternative routes, may be provided to users via one or more computing devices. For instance, one or more notifications (e.g., of road conditions, alternate routes, etc.) may be transmitted to a computing device of a user, such as a smart phone 212a, personal digital assistant 212b, tablet computing device 212c, cell phone 212d, other computing device 212e, and/or an on-board vehicle computing device 212f.

In some examples, the sensor data received and/or processed by the system may be controlled based on one or more conditions. For instance, although a road segment may have a fixed number of sensors detecting conditions, the system may receive data from a portion of the sensors (e.g., less than all the sensors) when certain conditions are met. For instance, if it is daylight, data might be received from less than all sensors on a road segment. If the weather is dry and clear, data may be received from less than all the sensors on the road segment. Alternatively, if it is dark and/or the weather conditions are poor, data may be received from all sensors in order to obtain as much data as possible.

In some examples, receiving data from less than all sensors may include controlling sensors transmitting data. For instance, dynamic navigational data module 210, or other device within the blind corner navigation system 200 may transmit an indication to one or more sensors to not transmit data until reactivated. Additionally or alternatively, dynamic navigational data module 210 may filter the data upon receipt. That is, data may be received from all sensors on a road segment but only data from some sensors may be processed in order to conserve resources (e.g., computing resources), streamline the processing of data, improve data processing time, etc. In some examples, a determination of whether the conditions are sufficient to receive/process data from fewer than all sensors in a road segment may be made by the blind corner navigation system (e.g., the dynamic navigational data module 210 may receive current condition information and may determine whether conditions meet pre-stored or pre-defined criteria to receive/process data from less than all sensors).

Figure 3:
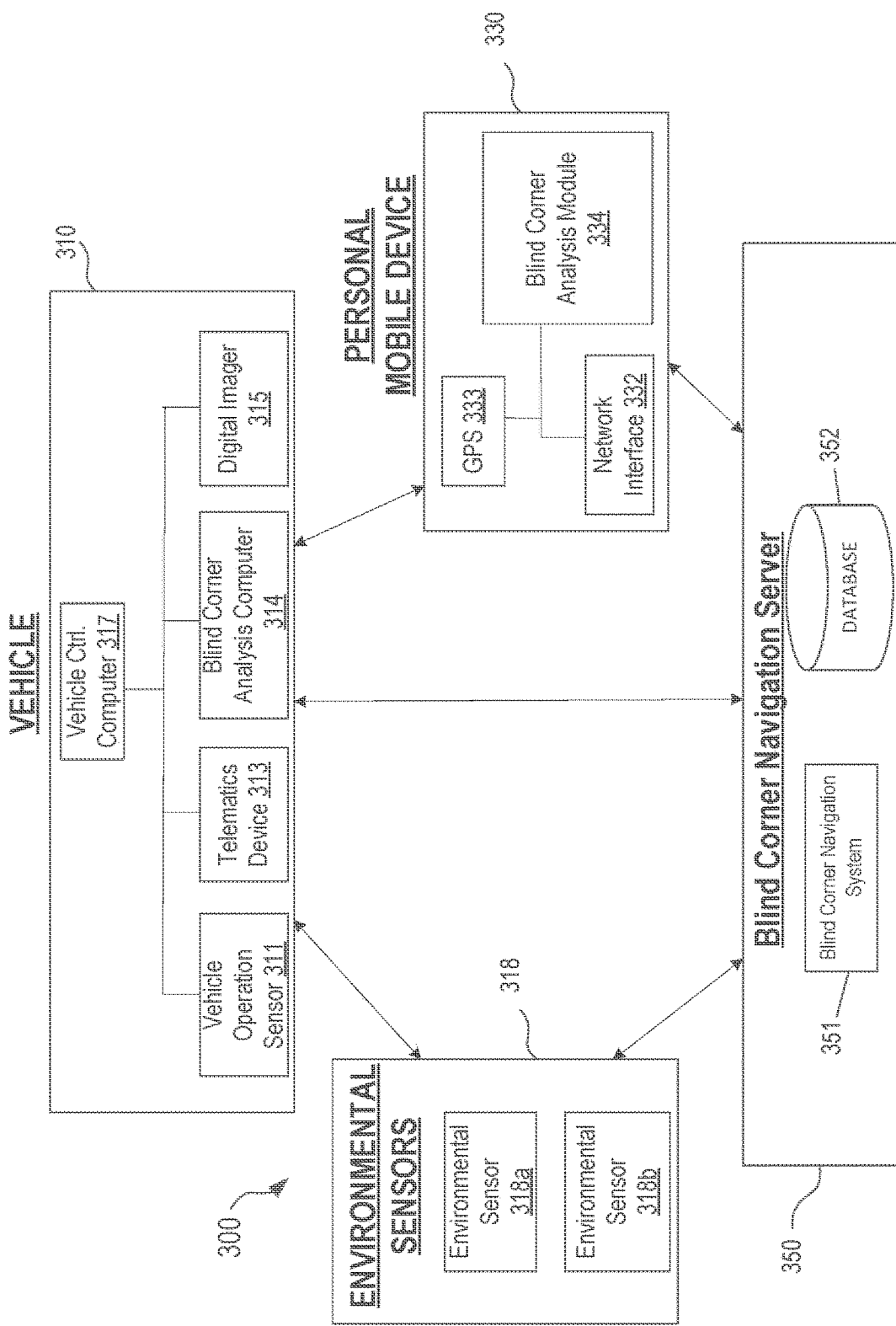
FIG. 3 is an example blind corner navigation system environment illustrating various communications between vehicle-based devices, a personal mobile device, and blind corner navigation server, according to one or more aspects of the disclosure.

FIG. 3 is a diagram of an illustrative blind corner navigation system 300 including additional aspects not shown in the blind corner navigation system 200 of FIG. 2 and/or implementing the blind corner navigation system 200 of FIG. 2. The blind corner navigation system 300 includes a vehicle 310, a personal mobile device 330, a blind corner navigation server 350, a plurality of environmental sensors 318a and 318b, and additional related components. In an alternative embodiment, the blind corner navigational system may include a navigation device installed at a vehicle. The navigation device may include a blind corner analysis computer that may contain some or all of the hardware/software components as the computing device 101 depicted in FIG. 1. The blind corner analysis computer of the navigation device may be configured to store and analyze driver data, vehicle data, driving data and driving behaviors, environmental sensor data, map data, image data, determine an upcoming blind corner, calculate a likelihood that the upcoming blind corner is visible from a vantage point of a traveling or stationary vehicle, trigger the transmittal of warning signals and/or control events to the vehicle, and the like. As discussed below, the components of the system 300, individually or using communication and collaborative interaction, may determine upcoming blind corners and, based on digital data received from a traveling vehicle, determine a likelihood that the blind corner is visible from the vantage point of the traveling vehicle. To perform such features, aspects of the components shown in FIG. 3 each may be implemented in hardware, software, or a combination of the two. Additionally, each component of the system 300 may include a computing device (or system) having some or all of the structural components described above for computing device 101.

Vehicle 310 in the system 300 may be, for example, an automobile, a motorcycle, a scooter, a bus, a recreational vehicle, a boat, or other vehicle for which vehicle data, location data, driver data (or operator data), operational data and/or other driving data (e.g., location data, time data, weather data, etc.) may be collected and analyzed. Vehicle 310 may include vehicle control computer 317. Vehicle control computer 317 may include an on-board vehicle computing device having a display arranged, for instance, in a dashboard of the vehicle. The vehicle control computer 317 may be connected to or in communication with one or more systems, sub-systems, or components of the vehicle (e.g., braking control systems, speed control systems, and the like). In some examples in which the system anticipates a potential hazard (as discussed below) the vehicle control computer may automatically modify operation of the vehicle and/or transmit one or more signals to one or more systems, sub-systems, or components of the vehicle to modify operation of the vehicle, as discussed herein.

The vehicle 310 includes one or more vehicle operation sensors such as vehicle operation sensor 311 (similar to one or more of sensors 216a-216b of FIG. 2) capable of detecting and recording various conditions at the vehicle and operational parameters of the vehicle. For example, a vehicle operation sensor may detect and store data corresponding to the vehicle's location (e.g., GPS coordinates), time, travel time, speed and direction, rates of acceleration or braking, gas mileage, and specific instances of sudden acceleration, braking, swerving, and distance traveled. A vehicle operation sensor also may detect and store data received from the vehicle's 310 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, autonomous driving system usage, maintenance performed on the vehicle, and other data collected by the vehicle's computer systems, including the vehicle on-board diagnostic systems (OBD).

Additional vehicle operation sensors may detect and store the external driving conditions, for example, external temperature, rain, snow, light levels, and sun position for driver visibility. For example, additional vehicle operation sensors may include external cameras and proximity sensors that detect other nearby vehicles, vehicle spacing, traffic levels, road conditions, traffic obstructions, animals, cyclists, pedestrians, and other conditions that may factor into a driving data/behavior analysis. Additional vehicle operation sensors also may detect and store data relating to moving violations and the observance of traffic signals and signs by the vehicle 310. Additional vehicle operation sensors may detect and store data relating to the maintenance of the vehicle 310, such as the engine status, oil level, engine coolant temperature, odometer reading, the level of fuel in the fuel tank, engine revolutions per minute (RPMs), software upgrades, and/or tire pressure.

Vehicle operation sensors also may include cameras and/or proximity sensors capable of recording additional conditions inside or outside of the vehicle 310. For example, internal cameras may detect conditions such as the number of the passengers and the types of passengers (e.g. adults, children, teenagers, pets, etc.) in the vehicles, and potential sources of driver distraction within the vehicle (e.g., pets, phone usage, and unsecured objects in the vehicle). A vehicle operation sensor also may be configured to collect data identifying a current driver from among a number of different possible drivers, for example, based on driver's seat and mirror positioning, driving times and routes, radio usage, etc. Voice/sound data along with directional data also may be used to determine a seating position within a vehicle 310. A vehicle operation sensor also may be configured to collect data relating to a driver's movements or the condition of a driver. For example, vehicle 310 may include sensors that monitor a driver's movements, such as the driver's eye position and/or head position, etc. Additional vehicle operation sensors may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer, along with other biometric sensors.

Certain vehicle operation sensors also may collect information regarding the driver's route choice, whether the driver follows a given route, and to classify the type of trip (e.g. commute, errand, new route, etc.) and type of driving (e.g., continuous driving, parking, stop-and-go traffic, etc.). In certain embodiments, vehicle operation sensors may determine when and how often the vehicle 310 stays in a single lane or strays into other lane. A Global Positioning System (GPS), locational sensors positioned inside the vehicle 310, and/or locational sensors or devices external to the vehicle 310 may be used to determine the route, speed, lane position, road-type (e.g. highway, entrance/exit ramp, residential area, etc.) and other vehicle position/location data.

Vehicle operation sensors such as vehicle operation sensor 311 may be installed at, on, and/or within the vehicle. For example, a vehicle operation sensor may be installed with the passenger compartment, the engine compartment, or the trunk of the vehicle. A vehicle operation sensor may also be attached to the exterior or the interior of the vehicle. A vehicle operation sensor may provide sensor data via a wired or wireless communication interface. For example, a vehicle operation sensor may wirelessly provide sensor data to, e.g., the personal mobile device 360 and/or the blind corner navigation server 350. In another example, a vehicle operation sensor may provide sensor data via the OBD port of the vehicle to a data collection device connected to the OBD port. The data collection device may, in turn, provide the sensor data to, e.g., the personal mobile device 360 and/or the blind corner navigation server 350.

Vehicle 310 may further include digital imager 315. Digital imager 315 may comprise a vehicle-mounted digital imaging device, such as a digital camera. Alternatively, an optical imaging device or a light detection and ranging device may be used. Digital imager 315 may be configured to take digital images at preconfigured intervals, or when instructed to do so by vehicle control computer 317. Digital images may include images obtained using photographic imaging techniques, videographic imaging techniques, radar imaging techniques, sonar imaging techniques, and laser imaging techniques (e.g., LIDAR—Light Detection and Ranging), and other types of imaging techniques suitable for obtaining digital images of the route of travel.

The data collected by vehicle operation sensor 311 (as well as environmental sensors 318a and 318b) and digital imager 315 may be stored and/or analyzed within the vehicle 310, such as for example a blind corner analysis computer 314 integrated into the vehicle, and/or may be transmitted to one or more external devices. The data collected by vehicle operation sensor 311 (as well as environmental sensors 318a and 318b) and digital imager 315 may be transmitted to telematics device 313 and/or vehicle control computer 317. Telematics device 313 may be one or more computing devices containing many or all of the hardware/software components as the computing device 101 depicted in FIG. 1. The telematics device 313 may receive vehicle operation data and driving data from vehicle operation sensor 311 and image data from digital imager 315, and may transmit the data to one or more external computer systems (e.g., personal mobile device 330, blind corner navigation system 200, blind corner navigation server 350 of an insurance company, financial institution, or other entity) over a wireless transmission network. Telematics device 313 also may be configured to detect or determine additional types of data relating to real-time driving and the condition of the vehicle 310. Telematics device 313 may transmit the additional types of data determined or detected by telematics device 313 to one or more external computer systems (e.g., personal mobile device 330, blind corner navigation system 200, blind corner navigation server 350 of an insurance company, financial institution, or other entity) over a wireless transmission network. The telematics device 313 also may store the type of vehicle 310, for example, the make, model, trim (or sub-model), year, and/or engine specifications, as well as other information such as vehicle owner or driver information, insurance information, and financing information for the vehicle 310. Telematics device 313 may transmit this data to one or more external computer systems (e.g., personal mobile device 330, blind corner navigation system 200, blind corner navigation server 350 of an insurance company, financial institution, or other entity) over a wireless transmission network.

As shown in FIG. 3, the data collected by vehicle operation sensor 311 and digital imager 315 may be transmitted to blind corner navigation server 350, personal mobile device 330, and/or additional external servers and devices via telematics device 313.

In the example shown in FIG. 3, telematics device 313 may receive vehicle driving data from vehicle operation sensor 311 and image data from digital imager 315, and may transmit the data to a blind corner navigation server 350. However, in other examples, one or more of the vehicle operation sensors such as vehicle operation sensor 311 or digital imager 315 may be configured to receive and transmit data directly from or to a blind corner navigation server 350 without using a telematics device. For instance, telematics device 313 may be configured to receive and transmit data from certain systems or vehicle operation sensors such as vehicle operation sensor 311, while other vehicle operation sensors or systems may be configured to directly receive and/or transmit data to a blind corner navigation server 350 without using the telematics device 313. Thus, telematics device 313 may be optional in certain embodiments.

The system 300 in FIG. 3 also includes a mobile device 330. Mobile devices 330 may be, for example, smartphones or other mobile phones, personal digital assistants (PDAs), tablet computers, and the like, and may include some or all of the elements described above with respect to the computing device 101. As shown in this example, some mobile devices in systems 300 (e.g., mobile device 330) may be configured to establish communication sessions with vehicle-based devices and various internal components of vehicle 310 via wireless networks or wired connections (e.g., for docked devices), whereby such mobile devices 330 may have secure access to internal vehicle operation sensors, digital imager 315 and other vehicle-based systems. However, in other examples, the mobile device 330 might not connect to vehicle-based computing devices and internal components, but may operate independently by communicating with vehicle 310 via their standard communication interfaces (e.g., telematics device 313, etc.), or might not connect at all to vehicle 310.

Mobile device 330 may include a network interface 332, which may include various network interface hardware (e.g., adapters, modems, wireless transceivers, etc.) and software components to enable mobile device 330 to communicate with blind corner navigation server 350, vehicle 310, environmental sensors 318a and 318b, and various other external computing devices. One or more specialized software applications, such as a blind corner analysis application 334 may be stored in the memory of the mobile device 330. The blind corner analysis application 334 may be received via network interface 321 from the blind corner navigation server 350, vehicle 310, or other application providers (e.g., application stores). As discussed below, the blind corner analysis application 334 may or may not include various user interface screens, and may be configured to run as user-initiated applications or as background applications. The memory of the mobile device 330 also may include databases configured to receive and store vehicle data, driving data, road segment data, map data, digital image data, driving trip data, and the like, associated with one or more drivers, vehicles, and/or road segments.

Like the vehicle-based computing devices in vehicle 310, mobile device 330 also may include various components configured to generate and/or receive vehicle data, driver data, and driving data or other operational data, as well as communicate with environmental sensors 318a and 318b to obtain road segment data (such as blind corner data) and/or conditions. For example, using data from the GPS receiver 333, blind corner analysis application 334 may be able to identify starting and stopping points of driving trips, determine driving speeds, times, routes, and the like. Further using data from the GPS receiver 333, blind corner analysis application 334 may be able to determine predefined blind corners on a route using received map data and/or driving data. Additional components of mobile device 330 may be used to generate or receive driving data for the blind corner analysis application 334, such as an accelerometer, compass, and various cameras and proximity sensors. Additional components of the mobile device 330 may receive signals or data from road segment sensors and the blind corner analysis application 334 may use this data to evaluate road segment characteristics, conditions, and the like. As discussed herein, the blind corner analysis software application 334 may store and analyze the data from various mobile device components, road segment sensors, historical data, and the like, and may use this data, in conjunction with one or more other devices (e.g., blind corner navigation server 350), to determine an upcoming blind corner and to calculate a likelihood that the upcoming blind corner is visible from a vantage point of a traveling or stationary vehicle.

When mobile computing devices within vehicles are used to detect vehicle driving data, to receive vehicle driving data from vehicle sensors or imaging devices, and/or to receive data from one or more environmental sensors, such mobile computing devices 330 may store, analyze, and/or transmit the data to one or more other devices. For example, mobile computing device 330 may transmit data directly to one or more blind corner navigation servers 350, and thus may be used in conjunction with or instead of telematics devices such as telematics device 313. Moreover, the processing components of the mobile computing device 330 may be used to evaluate sensor data to determine upcoming blind spots, processing imaging data, calculate a likelihood that the upcoming blind corner is visible from a vantage point of a traveling or stationary vehicle, control sensor data received and/or processed, and perform other related functions. Therefore, in certain embodiments, mobile computing device 330 may be used in conjunction with, or in place of, the blind corner navigation server 350.

Vehicle 310 may include blind corner analysis computer 314, which may be separate computing devices or may be integrated into one or more other components within the vehicle 310, such as the telematics device 313, autonomous driving systems, or the internal computing systems of vehicle 310. As discussed above, blind corner analysis computers also may be implemented by computing devices independent from the vehicle 310, such as mobile computing device 330 of the drivers or passengers, or one or more separate computer systems (e.g., a user's home or office computer). In any of these examples, the blind corner analysis computer 314 may contain some or all of the hardware/software components as the computing device 101 depicted in FIG. 1. Further, in certain implementations, the functionality of the driving analysis computers, such as storing and analyzing driver data, vehicle data, driving data and driving behaviors, environmental sensor data, map data, image data, determining an upcoming blind corner, calculating a likelihood that the upcoming blind corner is visible from a vantage point of a traveling or stationary vehicle, and the like, may be performed in a central blind corner navigation server 350 rather than by the individual vehicle 310 or personal mobile device 330. In such implementations, the vehicle 310 and and/or mobile device 330, might only collect and transmit driver data, sensor data, imaging data, and the like to blind corner navigation server 350, and thus the vehicle-based blind corner analysis computer 314 may be optional.

The system 300 also may include one or more blind corner navigation servers 350, containing some or all of the hardware/software components as the computing device 101 depicted in FIG. 1. The blind corner navigation server 350 may include hardware, software, and network components to receive driver data, vehicle data, map data, digital imaging data, and vehicle operational data/driving data from one or more vehicles 310, mobile devices 330, and other data sources, as well as environmental sensor data from one or more environmental sensors 318a and 318b, mobile devices 330, and other data sources. The blind corner navigation server 350 may include a blind corner database 352 and blind corner navigation analysis system 351 to respectively store and analyze driver data, vehicle data, map data, digital imaging data, sensor data, and driving data, etc., received from vehicle 310, mobile device 330, environmental sensors 318a and 318b, and other data sources. In some examples, the blind corner navigation analysis system 351 may include many or all of the components of the blind corner navigation system 200 described with respect to FIG. 2.

The blind corner navigation server 350 may initiate communication with and/or retrieve driver data, vehicle data, environmental sensor data, map data, digital imaging data, and driving data from vehicle 310 wirelessly via telematics device 313, mobile device 330, or by way of separate computing systems over one or more computer networks (e.g., the Internet). Additionally, the blind corner navigation server 350 may receive additional data from other third-party data sources, such as external traffic databases containing traffic data (e.g., amounts of traffic, average driving speed, traffic speed distribution, and numbers and types of accidents, etc.) at various times and locations, external weather databases containing weather data (e.g., rain, snow, sleet, and hail amounts, temperatures, wind, road conditions, visibility, etc.) at various times and locations, and other external data sources containing driving hazard data (e.g., road hazards, traffic accidents, downed trees, power outages, road construction zones, school zones, and natural disasters, etc.), route and navigation information, and insurance company databases containing insurance data (e.g., driver score, coverage amount, deductible amount, premium amount, insured status) for the vehicle, driver, and/or other nearby vehicles and drivers.

Data stored in the road segment database 352 may be organized in any of several different manners. For example, a blind corner table may contain data related to features of the blind corner (such as the location of the blind corner), historical accident data for each blind corner, historical rating data for each blind corner, and the like. Other tables in the database 352 may store additional data, including data types discussed above (e.g. traffic information, road-type and road condition information, weather data, insurance policy data, etc.). Additionally, one or more other databases of other insurance providers containing additional driver data and vehicle data may be accessed to retrieve such additional data.

The blind corner navigation analysis system 351 within the blind corner navigation server 350 may be configured to retrieve data from the database 352, or may receive driver data, environmental sensor data, vehicle data, map data, digital imaging data, and driving trip directly from vehicle 310, mobile device 330, environmental sensors 318a and 318b, or other data sources, and may perform blind corner navigation analyses by determining an upcoming blind corner and calculating a likelihood that the blind corner is visible from the vantage point of a selected vehicle, and other related functions. The functions performed by the blind corner navigation analysis system 351 may be performed by specialized hardware and/or software separate from the additional functionality of the blind corner navigation server 350. Such functions may be similar to those of blind corner analysis module computer 314 of vehicle 310, and the blind corner analysis application 334 of mobile device 330, and further descriptions and examples of the algorithms, functions, and analyses that may be executed by the blind corner navigation analysis system 351 are described herein.

In various examples, the blind corner analyses and determinations may be performed entirely in the blind corner navigation server 350, may be performed entirely in the vehicle-based blind corner analysis computing module 314, or may be performed entirely in the blind corner analysis application 334 of mobile device 330. In other examples, certain analyses of driver data, environmental sensor data, map data, digital imaging data, vehicle data, and driving trip data, may be performed by vehicle-based devices (e.g., within blind corner analysis device 314) or mobile device 330 (e.g., within application 334), while other data analyses are performed by the blind corner navigation analysis system 351 at the blind corner navigation server 350. For example, a vehicle-based blind corner analysis computer 314, or the hardware and software components of mobile device 330 may continuously receive and analyze driver data, environmental data, map data, vehicle data, driving trip data, and the like to detect blind corners so that large amounts of data need not be transmitted to the blind corner navigation server 350. Additionally or alternatively, the blind corner navigation server may receive data from the environmental sensors 318a and 318b, vehicle based sensors, a vehicle-mounted digital imaging device, and other data sources, and may evaluate blind corners and transmit the outcome to a computing device of a user. Various other combinations of devices processing data may be used without departing from the invention.

As discussed herein, environmental sensors 318a and 318b may include various types of sensors. For instance, environmental sensors 318a and 318b may include sensors to detect temperature, pressure, moisture, road treatments, and the like. The environmental sensors 318a and 318b may be physically placed or embedded in the road segment at various intervals in order to collect and transmit data to evaluate road segment conditions. Alternatively, or additionally, environmental sensors 318a and 318b may be placed on or within stationary devices within a predefined distance of a road segment, such as a traffic light, stop sign, curb, traffic barricades, and/or safety barriers. Additionally or alternatively, sensors for detecting different conditions may be contained within a single independent housing unit, each with the capability to detect one or more different conditions (e.g., each sensor may include a temperature sensor, a pressure sensor, etc.).

Figure 4:
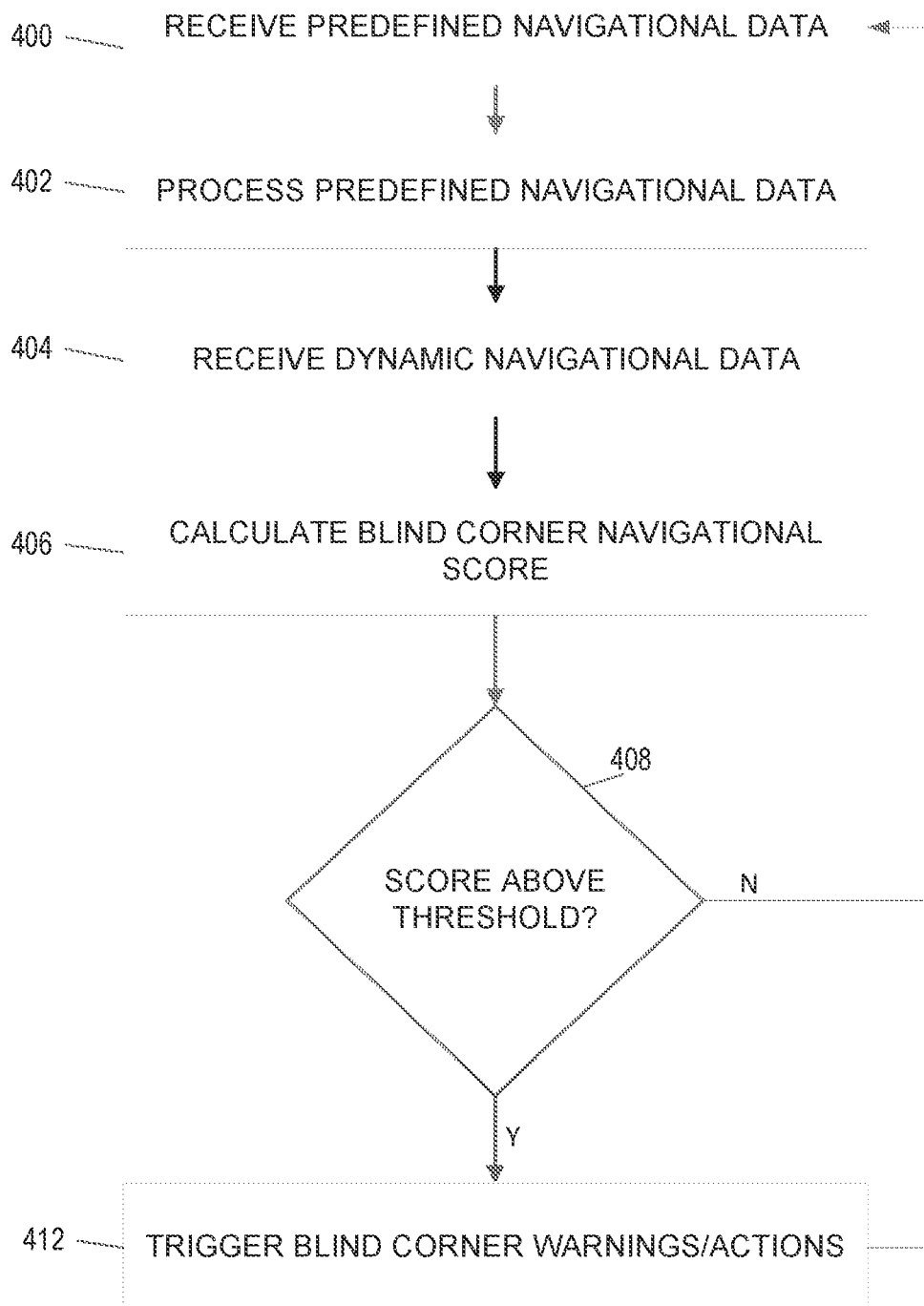
FIG. 4 is a flow diagram illustrating an example method of determining a blind corner navigational score according to one or more aspects described herein.

FIG. 4 is a flow chart illustrating one example method of determining a blind corner navigational score based on received data. The steps shown in the flow chart may be executed by a single computing device, such as vehicle control computer 317, personal mobile device 330, blind corner navigation system 200, or blind corner navigation server 350. Alternatively, execution of the steps shown in the flow chart may be distributed between vehicle control computer 317, personal mobile device 330, blind corner navigation system 200, and blind corner navigation server 350. The illustrated method may be performed automatically at regular time intervals (i.e. every 0.5 seconds, every second, every n seconds, etc.), automatically at irregular intervals, or on-demand in response to an instruction received from a user. At step 400, predefined navigational data may be received. Predefined navigational data may be specific to the current location of a vehicle for which a blind corner navigational score is being calculated. That is, predefined navigational data may be received for specific road segment on which a vehicle is traveling or for a predefined radius around the current location of the vehicle.

Predefined navigational data may include map data. Road information (e.g. road attribute data) in the map data may comprise data about the physical attributes of the road (e.g., slope, pitch, surface type, grade, number of lanes, traffic signals and signs and the like). In some aspects, the road information may indicate the presence of other physical attributes of the road, such as a pothole(s), a slit(s), an oil slick(s), a speed bump(s), an elevation(s) or unevenness (e.g., if one lane of road is higher than the other, which often occurs when road work is being done), etc. In some embodiments, road information may comprise the physical conditions of the road (e.g., flooded, wet, slick, icy, plowed, not plowed/snow covered, etc.). In some instances, road information may be data from a sensor that gathers and/or analyzes some, most, or all vertical changes in a road. In other examples, road information may include information about characteristics corresponding to the rules of the road or descriptions of the road: posted speed limit, construction area indicator (e.g., whether location has construction), topography type (e.g., flat, rolling hills, steep hills, etc.), road type (e.g., residential, interstate, 4-lane separated highway, city street, country road, parking lot, etc.), road feature (e.g., intersection, gentle curve, blind curve, bridge, tunnel), number of intersections, whether a roundabout is present, number of railroad crossings, whether a passing zone is present, whether a merge is present, number of lanes, width of roads/lanes, population density, condition of road (e.g., new, worn, severely damaged with sink-holes, severely damaged by erosion, gravel, dirt, paved, etc.), locations of various landmarks that are commonly found near roadways (traffic lights, traffic signs, street signs, safety barriers, traffic barricades, safety barriers, etc.) wildlife area, state, county, and/or municipality. In some embodiments, road information may include data about infrastructure features of the road. For example, infrastructure features may include intersections, bridges, tunnels, railroad crossings, and other roadway features.

In some aspects, road information may include a large number (e.g., 300) attributes or more for each road segment. Each road may include one or more road segments, and different roads may include a different number of road segments. Also, road segments may vary in length. In some embodiments, road segments may be determined based on the attributes. These attributes may be obtained from a database or via a sensor. In some cases, the attributes of each road segment may be geocoded to a specific road segment or a specific latitude and longitude. For example, the attributes may be things such as, but not limited to, road geometry, addresses, turn and speed restrictions, physical barriers and gates, one-way streets, restricted access and relative road heights, etc. As another example, the road attribute data may consist of information identifying that a road segment has a curvature of 6 degrees.

At step 402, the predefined navigational data may be processed to determine if the vehicle is approaching a blind corner. As noted above, road attribute data may consist of information identifying the curvature of a road segment. In one arrangement, the curvature may be identified using categorical descriptions, such as "gentle corner," "blind corner," "gentle curve," and/or "blind curve." In this arrangement, processing the predefined navigational data may include determining whether any upcoming corners and/or curves are marked with categorical descriptors indicating a blind corner or curve. In another arrangement, the curvature may be identified using a numerical value indicating a measured curvature (i.e. information identifying that a road segment has a curvature of 6 degrees). In this arrangement, processing the predefined navigational data may include determining whether any upcoming corners and/or curves have a curvature with a numerical value that is of a predefined value or within a predefined threshold. The predefined value or predefined threshold may be initially determined based on one or more factors, such as geographical location of the vehicle, and/or a driving profile of the driver of the vehicle. The driving profile may include one or more driving characteristics, such as reaction time (i.e. stop time), average speed, average acceleration/deceleration, previous reaction times to blind curves, etc. The predefined value/threshold may be dynamically adjusted based on the predefined navigational data received at step 400. For example, where the predefined navigational data indicates that the condition of the road is hazardous (i.e. the road is flooded, wet, slick, icy, not plowed/snow covered, has a high speed limit, is experiencing high traffic volume, has a high accident rate, etc.), a first predefined value/threshold may be used. Accordingly, where the predefined navigational data indicates that the condition of the road is safe (i.e. the road is dry, even, has a low speed limit, has a low accident rate, is experiencing low traffic volume, etc.) a second predefined value/threshold may be used. The first predefined threshold may be indicative of a sharper curve relative to the second predefined threshold. In another arrangement, the curvature may be defined in the context of a sliding scale. That is, the curvature of a road segment may be assigned a value on a scale of 1-10, wherein a value of "1" may indicate a gentle curvature and a value of "10" may indicate a sharp curvature. The use of a scale of 1-10 is for illustrative purposes, and a similar scale utilizing different numerical values (i.e. 1-5, 1-100) or alphabetical values (A-Z) may be used. In this arrangement, processing the predefined navigational data may include determining whether the numerical or alphabetical value assigned to the curvature represents a blind corner.

At step 404, dynamic navigational data may be received. Dynamic navigational data may include one or more real-time or near real-time images produced by a digital imaging device, such as digital imager 220/315. The digital imaging device may be mounted on the vehicle for which a blind corner navigational score is being calculated. Alternatively, the digital imaging device may be mounted on a second vehicle that is within a predefined distance of the vehicle for which a blind corner navigational score is being calculated. The images from the digital imaging device may be received at regular, predefined time intervals. Alternatively, or additionally, the images from the digital imaging device may be received in response to a request for images transmitted to the digital imaging device.

At step 406, a blind corner navigational score may be calculated. The blind corner navigational score may be calculated based on the predefined navigational data and the dynamic navigational data. The blind corner navigational score may represent a likelihood that the blind corner or curve identified in step 402 is visible from the vantage point of a vehicle based on the digital images received in step 404 from the digital imaging device mounted on the vehicle. The blind corner navigational score may be calculated using one or more predefined mathematical algorithms. The mathematical algorithm may include image-analysis algorithms. As noted above in reference to step 400, the predefined navigational data may include data indicating locations of various landmarks that are commonly found near roadways (traffic lights, traffic signs, street signs, safety barriers, traffic barricades, safety barriers, etc.) The predefined navigational data may be analyzed to identify one or more landmarks that are within a predefined vicinity of the blind corner detected in step 402. Calculation of the blind corner navigational score may include performing image analysis on the dynamic navigational data to determine whether these landmarks are visible within the digital images.

Figure 5A:
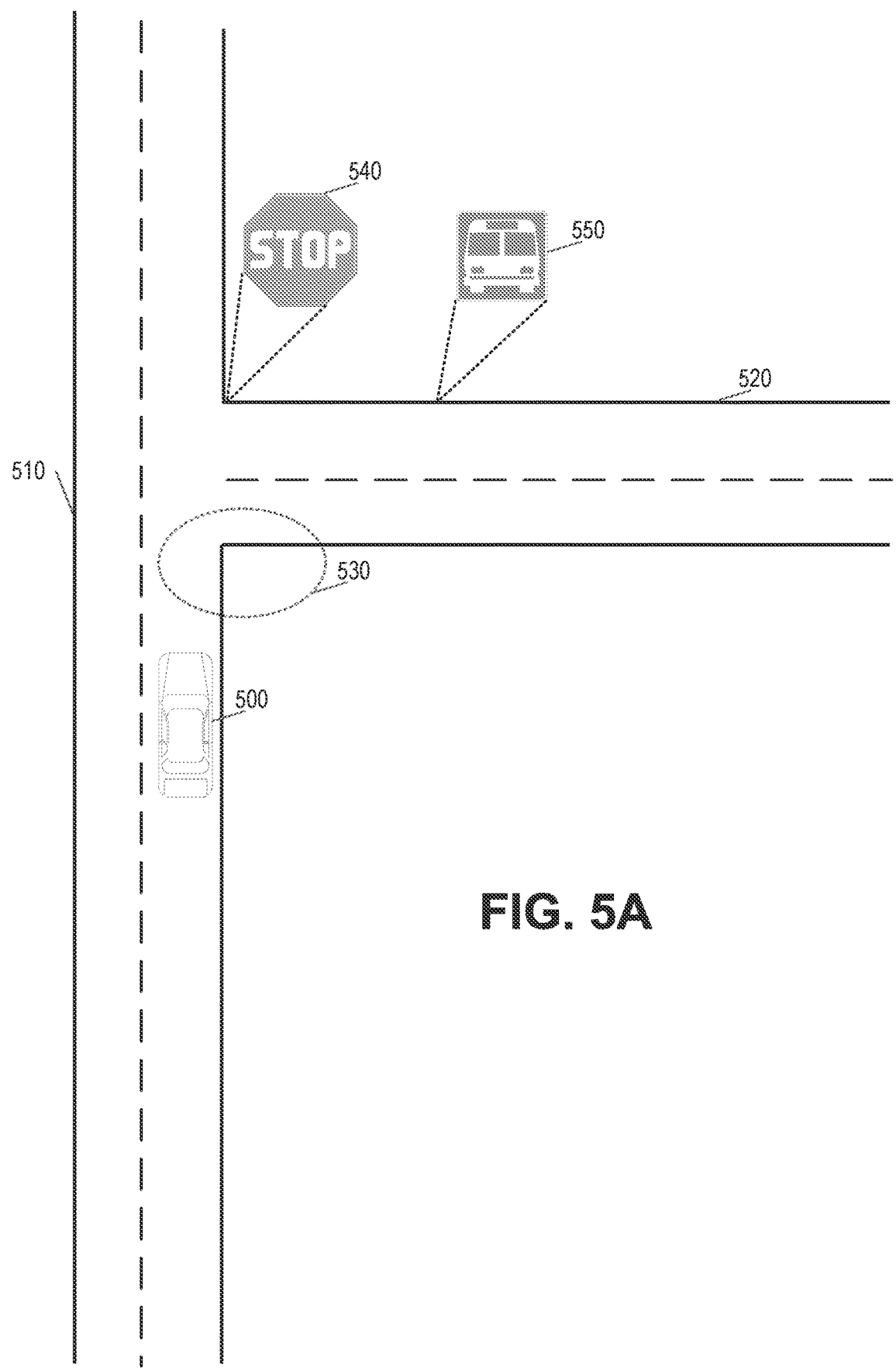
FIG. 5A is a block diagram illustrating an example scenario in which a blind corner navigational score may be calculated according to one or more aspects described herein.

For example, turning to FIG. 5A, vehicle 500 may be traveling on road 510. Map data including data characterizing the road 510, road 520, stop sign 540, and bus stop 550 may be received at predefined navigational data. Road segment 530 may be identified as a blind corner, and stop sign 540 and bus stop 550 may be identified as landmarks that are within a predefined distance of road segment 530. In this example, one or more digital images may be received from a digital imager (not shown) mounted on vehicle 500. Calculation of the blind corner navigational score may include analyzing these images to determine if landmarks such as stop sign 540 and/or bus stop 550 are visible within these images. If these landmarks are not visible within the digital images received from vehicle 500, there is a low likelihood that blind corner 530 is visible from the vantage point of vehicle 500. Accordingly, the blind corner navigational score may be assigned a first value. If these landmarks are visible within the digital images received from vehicle 500, there is a high likelihood that blind corner 530 is visible from the vantage point of vehicle 500. Accordingly, the blind corner navigational score may be assigned a second value. The first value may be higher than a second value. In one arrangement, the blind corner navigational score may be output to a user. The blind corner navigational score may be transmitted to a mobile device associated with the user, such as personal mobile device 330, or to a vehicle associated with the user, such as vehicle 310, or a navigational device associated with the user (not shown).

Alternatively, the system may be configured such that detecting that landmarks surrounding a blind corner are visible within digital images received from the vehicle indicates that the vehicle is approaching the blind corner. That is, in a first scenario, digital images from vehicle 500 may indicate that landmarks 540 and 550 are visible from the vantage point of vehicle 500. The system may interpret the visibility as an indication that the vehicle 500 is close to the blind corner and assign a relatively high value as the blind corner navigational score. In a second scenario, digital images from vehicle 500 may indicate that landmarks 540 and 550 are not visible from the vantage point of vehicle 500. The system may interpret the lack of visibility of the landmarks in the images as an indicating that the vehicle 500 is still relatively distant from the blind corner, and thus, that the driver does not yet need to be warned of the upcoming blind corner. Accordingly, in this second scenario, the blind corner navigational score may be assigned a relatively low value. Therefore, in the first scenario, because the blind corner navigational score is assigned a higher score, the blind corner navigational score is more likely to be above a threshold, thus resulting in warning signals and/or vehicular control event signals being transmitted to vehicle 500. In the second scenario, because the blind corner navigational score is assigned a lower score, the blind corner navigational score is likely to be below the threshold, thus resulting in no warning signals and/or vehicular control event signals being transmitted to vehicle 500.

Returning to FIG. 4, at step 408, it may be determined whether the blind corner navigational score is above a threshold value. The threshold value may be predefined, but may additionally be dynamically modified based on the predefined navigational data received at step 400. For example, where the predefined navigational data indicates that the condition of the road segment on which the blind corner is detected is hazardous (i.e. the road is flooded, wet, slick, icy, not plowed/snow covered, has a high speed limit, is experiencing high traffic volume, has a high accident rate, etc.), a first predefined value/threshold may be used. Accordingly, where the predefined navigational data indicates that the condition of the road segment on which the blind corner is detected is safe (i.e. the road is dry, even, has a low speed limit, has a low accident rate, is experiencing low traffic volume, etc.) a second predefined value/threshold may be used. The first predefined threshold may be lower than the second predefined threshold.

If, at step 408, it is determined that the blind corner navigational score is not greater than the threshold, processing may return to step 400. If, at step 408, it is determined that the blind corner navigational score is greater than the threshold, one or more blind corner warnings and/or blind corner corrective events may be triggered at step 412. Triggering the audio/visual warnings and/or the vehicular control events may include transmitting a warnings signal and/or a vehicular control event signal to the vehicle. Drivers may be given blind corner warnings via audio, visual, and/or tactile feedback. These may include, but are not limited to, an audio message, a video message, an audio alarm/beeping, flashing of lights within a car, flashing/ lighting one or more LED alarm lights, vibrating the steering wheel, and the like. The blind corner navigational score may determine the set of warnings to be outputted. For example, one or more LEDs may flash a blue light if the blind corner navigational score is above a first threshold, and may flash a red light if the blind corner navigational score is above a second threshold, where the first threshold is lower than the second threshold. In another example, the intensity of the vibration of the steering wheel may be related to the value of the blind corner navigational score (that is, a first value of a blind corner navigational score results in a first intensity of vibration and a second value of a blind corner navigational score results in a second intensity of vibration, wherein the second value and second intensity are higher than the first level and first intensity, respectively).

The audio warning, which may be in the form of an audio message, may be transmitted to one or more components of a vehicle (such as vehicle control computer 317) or to one or more devices within a vehicle (such as personal mobile device 330). Vehicle control computer 317 may then output the audio message via one or more audio devices associated with the vehicle. Similarly, personal mobile device 330 may output the audio message via one or more audio devices associated with the personal mobile device 330.

The video warning, which may include an audio message, may be transmitted to one or more components of a vehicle (such as vehicle control computer 317) or to one or more devices within a vehicle (such as personal mobile device 330). The video warning may include one or more textual/graphical elements indicating that the vehicle is approaching a blind corner. In one arrangement, the video warning may include an audio warning. Vehicle control computer 317 may then output the video message on the interior of the vehicle (e.g., on a display screen of a navigational device, LCD screen, LED screen, plasma screen, and the like), or on the windshield of the vehicle (e.g., heads-up display [HUD]). In some embodiments, vehicle control computer 317 may display the video message as a hologram, or on augmented reality (AR) glasses, or the like. Personal mobile device 330 may display the video message on a display screen of personal mobile device 330.

Any of the audio, visual, and/or tactile warnings may be customized based on user-settings. That is, a first driver of a first vehicle may configure the warnings such that only audio warnings are sent to the first vehicle. A second driver of a second vehicle may configure the blind corner warnings such that only video warnings and tactile warnings are sent to the second vehicle or a mobile computing device associated with the second driver. The first driver may further configure the blind corner warnings such that warnings are only sent to the first vehicle if the blind corner navigational score is above a first threshold. The second driver may further configure the blind corner warnings such that warnings are only sent to the second vehicle if the blind corner navigational score is above a second threshold. The first threshold may be the same as, higher than, or lower than the second threshold.

Additionally, any of the audio, visual, and/or tactile warnings may be customized based on the user characteristics of the driver. In one arrangement, driver profile data may be retrieved from data store 204, 206 and used as the basis for adjusting the transmittal of a warning signal. Driver profile data may include the driver's age, a quality of the driver's eye-sight, estimated reaction time, routes commonly driven by the driver, the number of blind corners on the driver's common routes, etc. In another arrangement, driver profile data, such as the reaction time of the driver, may have been previously determined or may be dynamically determined by one or more computing devices, such as blind corner navigation system 200 or blind corner navigation server 350. As discussed above, sensor data (including proximity data) and digital imaging data may be received from a traveling vehicle.

To determine the reaction time of a driver, blind corner navigation system 200, or blind corner navigation server 350 may analyze and measure the image and/or proximity data. For example, image and/or proximity data may show that a vehicle swerved to avoid hitting an object that was in the vehicle's path (e.g., a pedestrian, cyclist, animal, disabled vehicle, etc.). Blind corner navigation system 200 or blind corner navigation server 350 may analyze the image and/or proximity data to determine the distance between the object and the vehicle when the object entered the vehicle's path, or the distance at which the object was first visible to the driver of the vehicle. From this distance, blind corner navigation system 200 or blind corner navigation server 350 may use the vehicle's speed to calculate the amount of time that the driver had to react to the obstruction, and may compare that amount of time to the amount of time that the driver took to react to the observation. For instance, if the driver had a few seconds to react to the obstruction (e.g., 0-3 seconds), and the driver reacted to the obstruction within that time frame, the blind corner navigation system 200 or the blind corner navigation server 350 may determine that the driver has a relatively quick reaction time. On the other hand, if the driver had ample time (e.g., 5-10 seconds) to observe and avoid the obstruction, but only swerved at the last second, blind corner navigation system 200 or blind corner navigation server 350 may determine that the driver has a relatively slow reaction time. Blind corner navigation system 200 or blind corner navigation server 350 may store a driver's reaction time data in a user profile that may later be accessed when performing blind corner analysis.

Alternatively, the blind corner navigation system 200 may be configured to test the reaction time of a driver before the driver operates the vehicle and store a baseline reaction time for the driver as a type of driver profile data in the driver profile. For example, while the vehicle is in an inoperative state (e.g., parked and/or not running), the blind corner navigation system 200 may initiate a reaction time test in which the driver is instructed to apply the brakes when presented with a notification. The notification may be a visible notification (e.g., presented at a dashboard display within the vehicle) and/or an audible notification (e.g., presented using the audio system of the vehicle). The blind corner navigation system 200 may then present the notification random amount of time following initiation of the test (so as to be unexpected to the driver), and measure the duration between presentation of the notification and application of the brakes. The blind corner navigation system 200 may repeat the test one or more times and set the baseline reaction time of the driver profile to the average of multiple test results. The blind corner navigation system 200 may be configured to measure the reaction time of the driver at different times of the day, e.g., in the morning when the driver might be expected to be rested and thus more alert and at night when the driver might be expected to be tired and thus less alert. The driver profile may thus also include a reaction time offset that is used to adjust the baseline reaction time depending on the time of day during which the driver is operating the vehicle.

The driver profile data retrieved from data store 204, 206 and/or calculated by the blind corner navigation system 200 or the blind corner navigation server 350 may be used to configure the timing of the warning signals or the type of warnings output to the driver. For example, the warnings may be transmitted relatively sooner for younger drivers (e.g., teenagers), elderly drivers, and less experienced drivers (e.g., drivers with less than x number of years driving experience). In another example, the warnings may be transmitted relatively sooner for drivers with relatively slow reaction times. In another example, the audio level of a warning may be set to be relatively high for younger drivers (e.g., teenagers), elderly drivers, less experienced drivers (e.g., drivers with less than x number of years driving experience) and drivers with relatively slow reaction times.

The blind corner corrective events triggered at step 412 may include one or more control events for a vehicle. The one or more control events for the vehicle may be sent to a computing device associated with the vehicle, such as vehicle control computer 317. Vehicle control computer 317 may then execute the control events by controlling the appropriate device or by forwarding the received control event to the appropriate control device. In one arrangement, a blind corner corrective event may include a pre-tensioning of one or more seat belts in the vehicle. In this arrangement, the blind corner corrective event may be sent to the vehicle control computer 317. Vehicle control computer 317 may then forward the blind corner corrective event to the computing device that controls the seat belt tension (not shown).

Additionally, or alternatively, the blind corner corrective event may include an automatic braking (i.e. deceleration) of the vehicle. That is, a control event that causes the speed of a vehicle to decrease via braking may be transmitted to a computing device of a vehicle (such as vehicle control computer 317). The vehicle control computer 317 may then forward the control event to device that controls the automatic braking of the vehicle. The amount of braking force to be applied (or, put differently, the amount of deceleration to be achieved) may be adjusted prior to transmitting the control event. Alternatively, the adjustment may be performed by the vehicle control computer 317.

Additionally, or alternatively, the blind corner corrective event may include flashing the vehicle lights as the vehicle approaches the blind corner to alert other vehicles that might be at the blind corner. Additionally, or alternatively, the blind corner corrective event might include transmitting a signal as the vehicle approaches the blind corner to indicate the vehicle's oncoming arrival. The signal may be received by a second vehicle near the blind corner, e.g., to alert the driver of the second vehicle not to enter the path of the oncoming vehicle. The signal may also be received by a traffic control device (e.g., traffic light, warning sign) which may then instruct another vehicle not to enter the roadway due to the vehicle approaching the blind corner.

The extent of the danger a blind corner poses may depend on the distance between the location of the intersection/curve and the point at which the intersection/curve becomes visible along the route of travel. For example, due to the reaction time of a driver, a first blind corner having a relatively smaller distance between the intersection/curve and the visibility point may be relatively more dangerous than a second blind corner having a relatively larger distance between the intersection/curve and the visibility point. In addition, different drivers may have different reaction times. As a result, the same blind corner may pose different levels of danger depending on the respective reaction times of drivers traveling along that route. For example, a blind corner may be relatively more dangerous to a driver having a relatively slower reaction time and relatively less dangerous to a driver having a relatively quicker reaction time.

Accordingly, in one arrangement, driver profile data may be retrieved from data store 204, 206 and used as the basis for adjusting the control event. Driver profile data may include the driver's age, a quality of the driver's eye-sight, estimated reaction time, routes commonly driven by the driver, the number of blind corners on the driver's common routes, etc. The speed of the vehicle may thus be adjusted based on one or more characteristics from the driver's profile. For example, for younger, inexperienced drivers, the speed may be reduced by a relatively high value, whereas for older, experienced drivers, the speed may be reduced by a relatively low value. In another example, the speed reduction for a first driver having a first reaction time may be less than the speed reduction for a second driver having a second reaction time that is slower than the first reaction time. In another example, the speed reduction for a first driver that commonly drives routes that have multiple blind corners may be less than the speed reduction for a second driver that commonly drives routes that have little or no blind corners. Additionally, or alternatively, characteristics of the vehicle, such as the type of the vehicle (truck-trailer, truck-semi-trailer, minivan, motorbike) and the weight of the vehicle, may be used to adjust how much the speed of the vehicle is reduced Additionally, or alternatively, environmental data from the predefined navigational data received at step 400 may be used to adjust how much the speed of the vehicle is reduced. As noted above, the predefined navigational data may include data about the physical attributes of the road (e.g., slope, pitch, surface type, grade, number of lanes, traffic signals and signs and the like), the presence of other physical attributes of the road (e.g., pothole(s), a slit(s), an oil slick(s), a speed bump(s), an elevation(s) or unevenness, and the like), the physical conditions of the road (e.g., flooded, wet, slick, icy, plowed, not plowed/snow covered, etc.), population density, condition of road (e.g., new, worn, severely damaged with sink-holes, severely damaged by erosion, gravel, dirt, paved, etc.), locations of various landmarks that are commonly found near roadways (traffic lights, traffic signs, street signs, safety barriers, traffic barricades, safety barriers, etc.), and lighting. Any one or combination of these characteristics may be used to determine the amount of brake force (or speed reduction) that is to be applied to the vehicle. For example, a greater force may be applied to the brakes if the upcoming blind corner is on a wet road than if the upcoming blind corner is on a dry road. In another example, a greater force may be applied to the brakes if there is a high traffic volume on the roads proximate to the upcoming blind corner than if there is a low traffic volume on the roads proximate to the upcoming blind corner. In another example, a greater force may be applied to the brakes if there are a high number of street lights proximate to the upcoming blind corner than if there are a low number of street lights proximate to the upcoming blind corner.

Additionally, or alternatively, vehicle data may be retrieved from data store 204, 206 and used as the basis for adjusting the control event. That is, data specific to the vehicle that is approaching the upcoming blind corner may be retrieved and used to adjust the control event. Vehicle data may include the size of the vehicle, the braking distance of the vehicle, the stopping distance of the vehicle, and the like. Any one or combination of these characteristics may be used to determine the amount of brake force that is to be applied to the vehicle. For example, a greater force may be applied to the brakes of a first vehicle with a first stopping distance than to a second vehicle with a second stopping distance that is shorter than the first stopping distance.

A different threshold value may be assigned to each of the audio, visual, and/or tactile blind corner warnings and/or the blind corner corrective events described above. That is, as discussed above, these warnings and/or corrective events may be triggered if the blind corner navigational score is above a first threshold. The determination of which of the above-described audio, visual, and/or tactile blind corner warnings and/or the blind corner corrective events to trigger may be based on comparing the blind corner navigational score to different thresholds that may be assigned to each potential blind corner warning and blind corner corrective event. For example, if the blind corner navigational score is above a second threshold, a first audio blind corner warning may be triggered. Additionally, or alternatively, if the blind corner navigational score is above a third threshold, a first visual blind corner warning may be triggered. Additionally, or alternatively, if the blind corner navigational score is above a fourth threshold, a first tactile warning may be triggered. Additionally, or alternatively, if the blind corner navigational score is above a fourth threshold, a first blind corner corrective action may be triggered. The first, second, third, and fourth threshold may different values or may share common values. These thresholds may be predefined by the driver of the vehicle, or may be set by the entity that maintains the blind corner navigation system 300. Once the warning signals and/or vehicular control event signals are transmitted to the vehicle, processing may return to step 402.

As discussed above, the illustrated method may be performed at regular time intervals (i.e. every 0.5 seconds, every second, every n seconds, etc.). Therefore, a first few iterations of the method performed when a vehicle is relatively far from a blind corner may result in no warning signals or vehicular control events being transmitted to the vehicle (i.e. the blind corner navigational score may not be above the threshold) as the blind corner and/or proximate landmarks may not be visible from the vantage point of the vehicle. However, successive iterations performed as the vehicle approaches the blind corner (i.e. as the vehicle becomes relatively close to the blind corner) may result in warning signals and/or vehicular control events being transmitted to the vehicle as the blind corner and/or proximate landmarks become visible from the vantage point of the vehicle. In addition, the duration between iterations may shorten as the vehicle approaches the blind corner. By way of example, when the current distance between a vehicle and an upcoming intersection or curve is between 2000 and 1000 feet, the method may be performed every second in order to determine whether that intersection or curve is visible. Between 1000 and 500 feet, the method may be performed every half-second to determine whether the intersection or curve is visible. After 500 feet, the method may be performed every one-tenth of a second to determine whether the intersection or curve is visible.

The warning signal or control event may be transmitted when the vehicle is within a threshold distance of the intersection or curve. The threshold distance at which the warning or control event is transmitted may depend on various factors as described herein including, e.g., the weight of the vehicle and any corresponding load, the speed of the vehicle, the reaction time of the driver, environmental conditions, and other factors which will be appreciated with the benefit of this disclosure. In some instances, the warning signal or control event may be suppressed if it is determined the driver has begun to slow the vehicle during the approach to the intersection or curve. In other instances, the warning signal or control event may be transmitted even if the driver has begun to slow the vehicle during the approach to the intersection or curve.

Figure 5B:
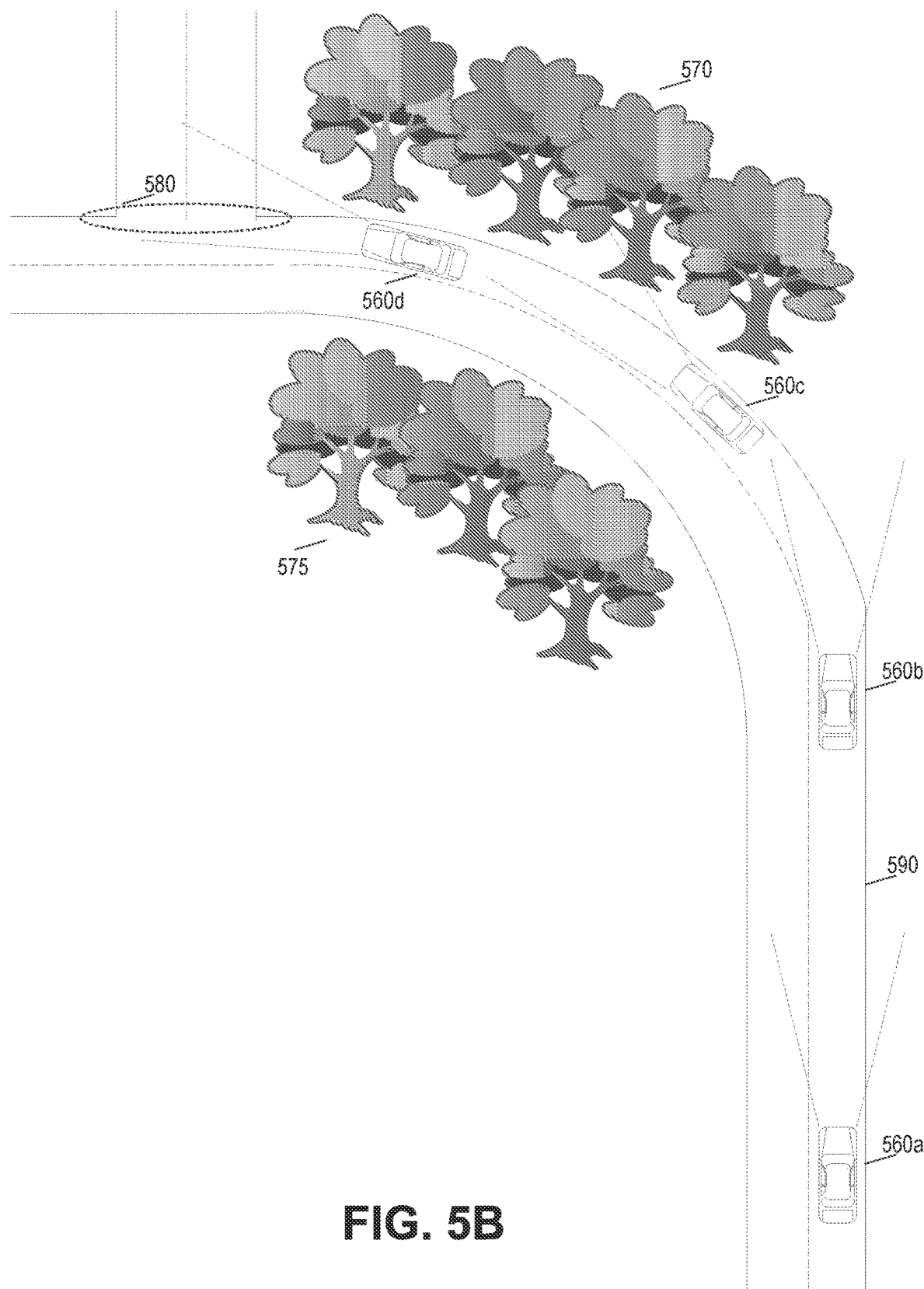
FIG. 5B is a block diagram illustrating an example scenario in which a blind corner navigational score may be calculated according to one or more aspects described herein

For example, turning to FIG. 5B, a first iteration of the illustrated method may be performed when a vehicle is at position 560a while traveling on road 590. Road 590 may be curved and a blind corner 580 may be obscured by the curvature of road 590 and trees 575. Processing of predefined navigational data may indicate that trees 570 (i.e. a landmark) are within a predefined distance of blind corner 580. One or more digital images may be received from the vehicle when it is at position 560a. As discussed above, processing of digital images may include determining if landmarks within a predefined distance of a blind corner are visible within the received digital images. If only a miniscule portion of the landmarks are visible within the digital images, a first set of warnings and/or vehicular control events may be triggered. If a relatively large portion of the landmarks are visible within the digital images, a second set of warnings and/or vehicular control events may be triggered. The second set of warnings and/or vehicular control events may be more severe or aggressive than the first set, because as bigger portions of the landmarks become visible within the digital images, the vehicle is likely to be getting closer to the blind corner. Additionally, processing of the digital images may include determining whether the upcoming blind corner is visible within the digital images. If the upcoming blind corner is visible, a relatively high blind corner navigational score may be assigned, as the vehicle is relatively close to the blind corner and the driver may need to be warned.

Processing of the digital images received from the vehicle when it is at position 560a may indicate that no portion of the trees 570 nor blind corner 580 are visible in the received digital images, thus indicating that blind corner 580 is not within the vantage point of the vehicle at position 560a. That is, the vehicle, at position 560a, is still relatively far from the blind corner and the driver may not yet need to be warning of upcoming blind corner 580. Therefore, the blind corner navigational score may be assigned a relatively low value. Accordingly, the blind corner navigational score calculated for the vehicle when it is at position 560a may be below the threshold, and no warning signals or vehicular control event signals may be transmitted to the vehicle.

During a second iteration of the illustrated method, the vehicle may be at position 560b. One or more digital images may be received from the vehicle when it is at position 560b. Processing of the received digital images may indicate that a portion of the trees 570 (but not blind corner 580) is now visible in the images, thus indicating that while blind corner 580 is not within the vantage point of the vehicle at position 560b, the vehicle is relatively close to blind corner 580. Accordingly, a relatively high blind corner navigational score may be calculated for the vehicle when it is at position 560b. The blind corner navigational score may be above the threshold and a first set of actions may be taken. Only a small portion of the trees 570 may be visible in digital images received from the vehicle when it is at position 560b, so the first set of actions may be less severe than if a larger portion of trees 570 were visible. For example, the first set of actions may include the transmittal of an audio warning signal but no vehicular control event signals.

During a third iteration of the illustrated method, the vehicle may be at position 560c. One or more digital images may be received from the vehicle when it is at position 560c. Processing of the received digital images may indicate that a portion of the trees 570 is now visible in the images, thus indicating that while blind corner 580 is not within the vantage point of the vehicle at position 560*c*, the vehicle is relatively close to blind corner 580. Accordingly, a relatively high blind corner navigational score may be calculated for the vehicle when it is at position 560*c*. The blind corner navigational score may be above the threshold and a second set of actions may be taken. A relatively large portion of the trees 570 may be visible in digital images received from the vehicle when it is at position 560*c*, so the second set of actions may be more severe than the first set. For example, the first set of actions may include the transmittal of both a video warning signal and one or more vehicular control events.

During a fourth iteration of the illustrated method, the vehicle may be at position 560*d*. One or more digital images may be received from the vehicle when it is at position 560*d*. Processing of the received digital images may indicate that the trees 570 are no longer visible in the images but that blind corner 580 is visible in the images, thus indicating that blind corner 580 is within the vantage point of the vehicle at position 560*d*. Because the blind corner 580 is within the vantage point of the vehicle at position 560*d*, the vehicle is relatively close to the upcoming blind corner 580. Accordingly, a relatively high blind corner navigational score may be calculated for the vehicle when it is at position 560*d*. The blind corner navigational score may be above the threshold, and a third set of actions may be taken. Because the blind corner 580 is visible in the digital images, the third set of actions may be aggressive so as to warn the driver as quickly and effectively as possible. The third set of actions may include multiple warning signals (for example, both a video warning signal and a haptic warning signal) and multiple vehicular control events (for example, both a pre-tensioning of the seat belt and an automatic deceleration of the vehicle).

In an alternative implementation, the blind corner navigation system may identify the current location of the vehicle and determine the route a vehicle is traveling. The blind corner navigation system may determine the route, for example, based on a predefined route selected by the driver or the vehicle. The blind corner navigation system may additionally or alternatively determine the route by comparing a current geographic location of the vehicle and compare that location to stored map data. The blind corner navigation system may retrieve map data corresponding to the road segments along and near the route the vehicle is traveling on. The blind corner navigation system may then analyze the map data to identify intersections and curves along the route that might constitute blind corners for the driver and/or the vehicle. The blind corner navigation system may then, for each potential blind corner identified, calculate a location along the route at which the potential blind corner should be visible to the driver and/or the vehicle. As the vehicle travels along the route, the blind corner navigation system may iteratively compare the current location of the vehicle to the locations at which the identified intersections or curves should be visible. When the vehicle approaches and/or arrives at a location at which an upcoming intersection or curve should be visible, the blind corner navigation system may determine whether that intersection or curve is, in fact, visible to the driver and/or the vehicle. The blind corner navigation system may then carry out one or more of the various actions described above (e.g., a warning, a control event) depending on whether the upcoming intersection or curve is determined to be visible.

Figure 6:
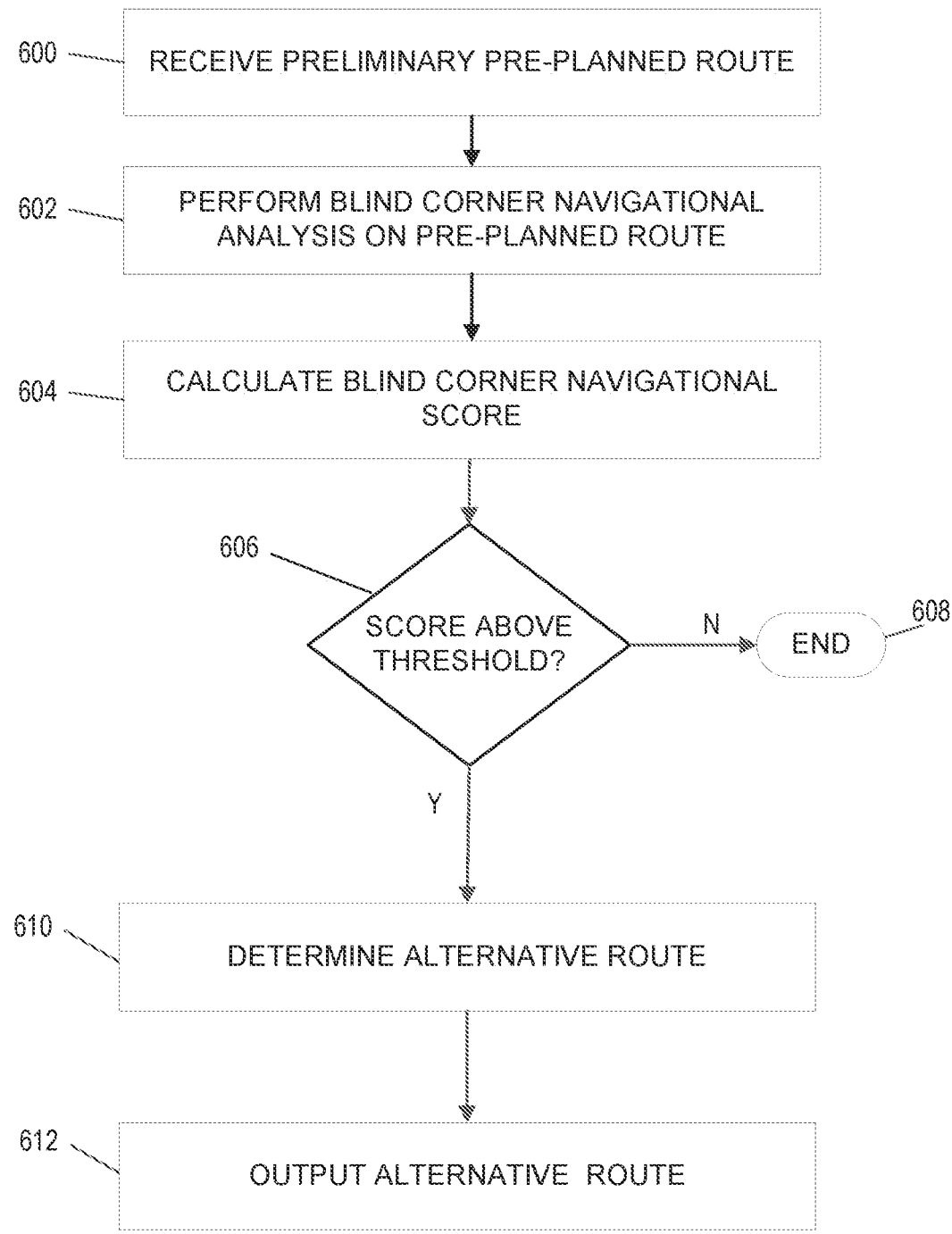
FIG. 6 is a flow diagram illustrating an example method of evaluating a pre-planned route for blind corner hazards according to one or more aspects described herein.

FIG. 6 is a flow chart illustrating one example of evaluating a pre-planned route for blind corner hazards according to one or more aspects described herein. The steps shown in the flow chart may be executed on one or more of vehicle control computer 317, personal mobile device 330, blind corner navigation system 200, or blind corner navigation server 350. In step 600, a preliminary pre-planned route may be received. The preliminary pre-planned route may be a route that a vehicle is currently traveling on, or a route that a vehicle is planning on traveling on. At step 602, blind corner navigational analysis may be performed for the preliminary route. Performing blind corner navigational analysis may include retrieving predefined navigational data for the preliminary route. As discussed above with reference to FIG. 4, predefined navigational data for the route may include road information for the roads that are a part of the preliminary route. As with step 400, predefined navigational data may include data about the physical attributes of the road (e.g., slope, pitch, surface type, grade, number of lanes, traffic signals and signs and the like), the presence of other physical attributes of the road (e.g., pothole(s), a slit(s), an oil slick(s), a speed bump(s), an elevation(s) or unevenness, and the like), the physical conditions of the road (e.g., flooded, wet, slick, icy, plowed, not plowed/snow covered, etc.), population density, condition of road (e.g., new, worn, severely damaged with sink-holes, severely damaged by erosion, gravel, dirt, paved, etc.), locations of various landmarks that are commonly found near roadways (traffic lights, traffic signs, street signs, safety barriers, traffic barricades, safety barriers, etc.), accident data, and lighting. The predefined navigational data may then be analyzed to identify the blind corners in the preliminary route.

In step 604, a blind corner navigational score may be calculated for the preliminary route. Calculation of the blind corner navigational score may include analyzing the level of curvature of each blind corner. As discussed above in reference to FIG. 4, in one arrangement, the curvature may be identified using categorical descriptions, such as "gentle corner," "blind corner," "gentle curve," and/or "blind curve." Each categorical description may be assigned with a score. Calculation of the blind corner navigational score may include assigning a score to each blind corner in the preliminary route based on the categorical description of that blind corner, and then summing the individual scores for each blind corner to generate a blind corner navigational score. The blind corner navigational score may then be adjusted based on one or more additional factors, such as the number of blind corners in the preliminary route.

As further discussed above in reference to FIG. 4, in a second arrangement, the curvature may be identified using numerical value indicating a measured curvature (i.e. information identifying that a road segment has a curvature of 6 degrees). In this second arrangement, calculation of the blind corner navigational score may include assigning a score to each blind corner in the preliminary route based on the numerical curvature of that blind corner. The individual scores assigned to each blind corner may then be summed to generate the blind corner navigational score. The blind corner navigational score may then be adjusted based on one or more additional factors, such as the number of blind corners in the preliminary route.

In one arrangement, the pre-planned route and the blind corner navigational score may be transmitted to one or more servers associated with an insurance company. One or more computing devices may analyze the pre-planned route and the blind corner navigational score to evaluate the hazard level associated with the pre-planned route or with one or more road segments that are part of the pre-planned route. The insurance company may then set insurance rates for the pre-planned route or with one or more road segments that are part of the pre-planned route based on the blind corner navigational score and the hazard levels.

In step 606, it may be determined if the blind corner navigational score is above a threshold value. The threshold value may be predefined, but may additionally be dynamically modified based on the predefined navigational data retrieved at step 602. The predefined threshold may be initially determined based on one or more factors, such as geographical location of the vehicle, and/or a driving profile of the driver of the vehicle. The driving profile may include one or more driving characteristics, such as reaction time (i.e. stop time), average speed, average acceleration/deceleration, previous reaction times to blind curves, etc. Dynamic modification of the predefined threshold value may be based on the predefined navigational data retrieved at step 602. For example, where the predefined navigational data indicates that the condition of the roads in the preliminary segment and/or the road segment on which the blind corner is detected is hazardous (i.e. the road is flooded, wet, slick, icy, not plowed/snow covered, has a high speed limit, is experiencing high traffic volume, has a high accident rate, etc.), a first predefined value/threshold may be used. Accordingly, where the predefined navigational data indicates that the condition of the roads in the preliminary segment and/or the road segment on which the blind corner is detected is safe (i.e. the road is dry, even, has a low speed limit, has a low accident rate, is experiencing low traffic volume, etc.) a second predefined value/threshold may be used. The first predefined threshold may be lower than the second predefined threshold.

If, at step 606, it is determined that the blind corner navigational score is not greater than the threshold, the process may end at step 608. That is, if the blind corner navigational score for the preliminary route is lower than the threshold, the preliminary route may deemed to be safe, and thus no further processing is needed. If, at step 606, it is determined that the blind corner navigational score for the preliminary route is greater than the threshold, one or more alternate routes may be calculated at step 610. The alternate routes may have been determined to be safer than the preliminary route. In one arrangement, the alternate routes may have a lower blind corner navigational score than the preliminary route. At step 612, the one or more alternate routes may be output to a user. The alternate routes may be transmitted to a mobile device associated with the user, such as personal mobile device 330, or to a vehicle associated with the user, such as vehicle 310, or a navigational device associated with the user (not shown).

Figure 7A:
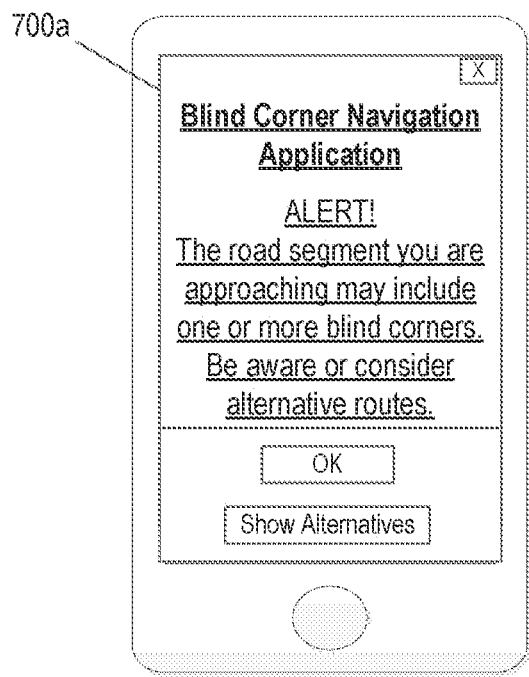
FIGS. 7A and 7B are example user interfaces for providing notifications to a user according to one or more aspects described herein.
Figure 7B:
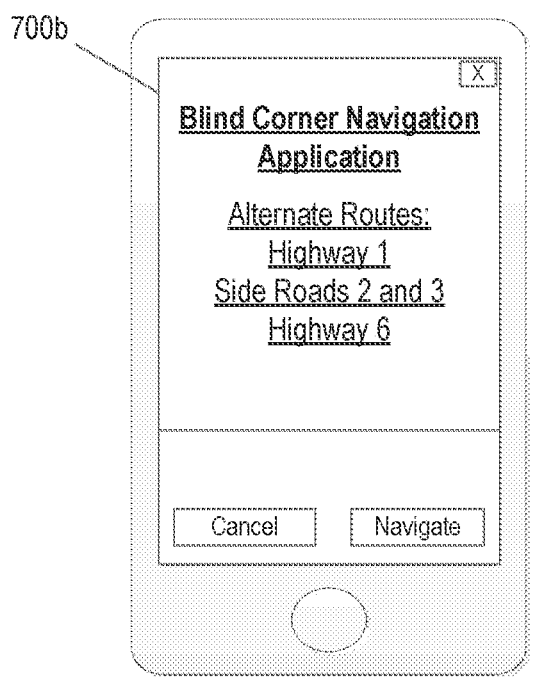

FIGS. 7A and 7B illustrate example user interfaces that may be displayed to a user to communicate a blind corner navigational score and/or recommended alternate routes according to one or more aspects described herein. FIG. 7A illustrates one example user interface 700a that provides a notification to a user that the driver is approaching an upcoming blind corner. The notification may further include the blind corner navigational score that is calculated for the upcoming blind corner. The interface may be provided to a user on a mobile device of the user, on-board vehicle computing device, or other device.

In some examples, the interface 700a may include an "OK" option which may clear the notification. The interface may also include an option to display alternative routes. Selection of "Show Alternatives" option may prompt display of interface 700b shown in FIG. 7B. Display of interface 700b may alternatively or additionally be prompted by the entering of a preliminary route that has a blind corner navigational score above a predefined threshold. The interface 700b provides one or more alternate routes that may avoid the upcoming blind corner or the predefined preliminary route. A user may select one or more of the alternative routes provided, as desired. The user may then select "Navigate" option to enable a navigation system to provide instructions to use the alternate route. Otherwise, a user may select to cancel the alternatives provided. The user interface may further display the difference in hazard-levels between the alternate routes (and the preliminary route, if applicable) and permit the driver to select the preferred route. In one arrangement, a driver/vehicle may be provided a monetary benefit (e.g., a credit towards a future insurance policy) for selecting a less hazardous route.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:
1. A blind corner navigation system, comprising:
at least one processor; and
at least one memory storing computer-executable instructions that, when executed by the at least one processor, cause the blind corner navigation system to:
receive a preliminary route from a mobile device;
receive image data from a digital imager device;
receive navigational data from a map database system;
process the preliminary route and the navigational data to identify one or more blind corners of the preliminary route;
generate a blind corner navigational score for the preliminary route by processing the navigational data received from the map data base system and the image data received from the digital imager device, the blind corner navigational score representing a likelihood that the one or more blind corners are visible from a vantage point of a vehicle;
compare the blind corner navigational score to a threshold;
based on a result of the comparing and based on driver profile data associated with a driver, generate a warning signal; and
transmit the warning signal to the mobile device.

2. The blind corner navigation system of claim 1, wherein the driver profile data comprises a reaction time of the driver.

3. The blind corner navigation system of claim 1, wherein the warning signal comprises an audible alarm.

4. The blind corner navigation system of claim 1, wherein the warning signal comprises a tactile alarm.

5. The blind corner navigation system of claim 1, wherein the processing the navigational data and the image data to determine the blind corner navigational score for the preliminary route comprises analyzing a level of curvature of each blind corner of the one or more blind corners.

6. The blind corner navigation system of claim 5, wherein the processing the navigational data and the image data to determine the blind corner navigational score for the preliminary route further comprises assigning a score to each blind corner of the one or more blind corners based on a level of curvature of that blind corner.

7. The blind corner navigation system of claim 6, wherein the processing the navigational data and the image data to determine the blind corner navigational score for the preliminary route further comprises summing the score assigned to each blind corner of the one or more blind corners.

8. The blind corner navigation system of claim 1, wherein the threshold is initially determined based on a driving profile of a driver of a vehicle and is dynamically modified based on weather conditions.

9. The blind corner navigation system of claim 1, wherein the threshold is determined by the driver.

10. A non-transitory computer readable medium storing instructions that, when executed by one or more processors, cause the one or more processors to:
    receive a preliminary route from a mobile device;
    receive navigational data from a map database system;
    receive image data from a digital imager device;
    process the preliminary route and the navigational data to identify one or more blind corners of the preliminary route;
    blind corner navigational score for the preliminary route by processing the navigational data received from the map data base system and the image data received from the digital imager device, the blind corner navigational score representing a likelihood that the one or more blind corners are visible from a vantage point of a vehicle;
    compare the blind corner navigational score to a threshold;
    based on a result of the comparing and based on driver profile data associated with a driver, generate a warning signal; and
    transmit the warning signal to the mobile device.

11. The non-transitory computer readable medium of claim 10, wherein the driver profile data comprises a reaction time of the driver.

12. The non-transitory computer readable medium of claim 10, wherein the warning signal comprises an audible alarm.

13. The non-transitory computer readable medium of claim 10, wherein the warning signal comprises a tactile alarm.

14. The non-transitory computer readable medium of claim 10, wherein the threshold is determined by the driver.

15. The non-transitory computer readable medium of claim 10, wherein the threshold is initially determined based on a driving profile of a driver of a vehicle and is dynamically modified based on weather conditions.

16. A method comprising:
    receiving a preliminary route from a mobile device;
    receiving navigational data from a map database system;
    receiving image data from a digital imager device;
    processing the preliminary route and the navigational data to identify one or more blind corners of the preliminary route;
    a blind corner navigational score for the preliminary route by processing the navigational data received from the map data base system and the image data received from the digital imager device, the blind corner navigational score representing a likelihood that the one or more blind corners are visible from a vantage point of a vehicle;
    comparing the blind corner navigational score to a threshold;
    based on a result of the comparing and based on driver profile data associated with a driver, generating a warning signal; and
    transmitting the warning signal to the mobile device.

17. The method of claim 16, wherein the driver profile data comprises a reaction time of the driver.

18. The method of claim 16, wherein the warning signal comprises an audible alarm.

19. The method of claim 16, wherein the warning signal comprises a tactile alarm.

20. The method of claim 16, wherein the threshold is determined by the driver.

\* \* \* \* \*